United States Patent
Agrawal et al.

(10) Patent No.: US 12,039,349 B1
(45) Date of Patent: Jul. 16, 2024

(54) ARTIFICIAL INTELLIGENCE (AI) ENGINE FOR DYNAMIC CONTENT DISTRIBUTION AND MANAGEMENT

(71) Applicant: PAYPAL, INC., San Jose, CA (US)

(72) Inventors: Atul Kumar Agrawal, Singapore (SG); Anu Kumari, Gorakhpur (IN); Anurag Singh, Singapore (SG); Chun Kiat Ho, Singapore (SG); RaviKumar PhoolChand Vishwakarma, Maharashtra (IN); Jie How Ko, Singapore (SG); Nilotpal Paul, Bangalore (IN); Jyothish Kozhipurath, Malappuram (IN); Vipul Jain, Singapore (SG); Lin Song, Singapore (SG); Mihir Sirohi, Delhi (IN); Rey Neo, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/309,636

(22) Filed: Apr. 28, 2023

(51) Int. Cl.
*G06F 9/451* (2018.01)
*G06F 16/957* (2019.01)

(52) U.S. Cl.
CPC ............ *G06F 9/451* (2018.02); *G06F 16/957* (2019.01)

(58) Field of Classification Search
CPC ................................ G06F 9/451; G06F 16/957
See application file for complete search history.

(56) References Cited

U.S. PATENT DOCUMENTS 7,451,352 B1 * 11/2008 Moore ................ G06F 11/0709
714/38.14
7,761,842 B2 * 7/2010 Udler ...................... G06F 9/451
717/110

(Continued)

FOREIGN PATENT DOCUMENTS

CN          110147510 B  *  2/2022  ............ G06F 16/957
WO      WO-0137170 A2  *  5/2001  ............ G06F 17/243

(Continued)

OTHER PUBLICATIONS

Alexandre Canny etc., "Model-Based Testing of GUI Applications Featuring Dynamic Instanciation of Widgets", IEEE International Conference on Software Testing, Verification, and Validation Workshops, Oct. 2020, pp. 95-104, retrieved Oct. 31, 2023. (Year: 2020).*

(Continued)

*Primary Examiner* — Shourjo Dasgupta
(74) *Attorney, Agent, or Firm* — .Haynes and Boone, LLP

(57) ABSTRACT

Methods and systems for content distribution and management are presented. A transaction flow for conducting different stages of a transaction is determined in response to a request for the transaction from an application executable at a user device. The transaction flow includes a sequence of content pages to be displayed within a graphical user interface (GUI) of the application over the different stages of the transaction. The content associated with a tagged UI element of at least one content page is identified. The content is validated for the tagged UI element of the at least one content page, based on a software and hardware configura- (Continued)

tion of the user device. The validated content is provided via a network to the application at the user device to be displayable with the tagged UI element on the at least one content page of the transaction flow during a corresponding stage of the transaction.

20 Claims, 15 Drawing Sheets

(56) References Cited

U.S. PATENT DOCUMENTS

| | | | | |
|---|---|---|---|---|
| 11,176,534 B1* | 11/2021 | Pandey | ................ | G06Q 20/12 |
| 11,257,144 B1* | 2/2022 | Hamel | ................ | G06Q 30/0631 |
| 11,308,480 B2* | 4/2022 | Gosalia | ............ | G06Q 20/3274 |
| 11,756,019 B2* | 9/2023 | Pandey | ................ | G06Q 20/12 |
| | | | | 705/39 |
| 2007/0044016 A1* | 2/2007 | Jackson | ............... | G06F 16/958 |
| | | | | 707/E17.116 |
| 2009/0313601 A1* | 12/2009 | Baird | ..................... | G06F 8/34 |
| | | | | 715/764 |
| 2014/0095587 A1* | 4/2014 | Schult | ................... | G06F 3/048 |
| | | | | 709/203 |
| 2014/0129942 A1* | 5/2014 | Rathod | ............ | H04N 21/44226 |
| | | | | 715/720 |
| 2015/0046204 A1* | 2/2015 | Sitina | ................ | G06Q 10/063 |
| | | | | 705/7.11 |
| 2018/0240162 A1* | 8/2018 | Krishnaswamy | .. | G06Q 30/0281 |
| 2019/0101882 A1* | 4/2019 | Strinden | ........... | G05B 19/4188 |
| 2019/0265869 A1* | 8/2019 | Beerana | ............ | G06F 3/04847 |
| 2022/0366131 A1* | 11/2022 | Ekron | .................. | G06F 16/958 |

FOREIGN PATENT DOCUMENTS

| | | | | |
|---|---|---|---|---|
| WO | WO-2004083989 A2 * | 9/2004 | ....... | G06F 17/30905 |
| WO | WO-2011148343 A1 * | 12/2011 | .......... | G06F 17/227 |

OTHER PUBLICATIONS

Vitaly Friedman, "A Complete Guide to Live Validation UX", published Sep. 21, 2022 to https://www.smashingmagazine.com/2022/09/inline-validation-web-forms-ux, retrieved Feb. 22, 2024. (Year: 2022).*

* cited by examiner

ARTIFICIAL INTELLIGENCE (AI) ENGINE FOR DYNAMIC CONTENT DISTRIBUTION AND MANAGEMENT

TECHNICAL FIELD

The present application relates generally to digital content distribution and management, and particularly, to dynamic content distribution and management using artificial intelligence.

BACKGROUND

An increasing number of consumers today are using their smart devices to make purchases and perform payment transactions over electronic networks. These users typically rely on the services of an online payment service provider to perform such transactions. For example, a user of an online payment service may initiate a payment transaction for the purchase of an item from an online marketplace via a web browser or other native application installed on the user's device for accessing various features of the online service. The user experience associated with conducting the transaction in this example may involve a transaction workflow in which authentication credentials and other critical information get exchanged between the user and the service provider. Many laws and regulations governing online services and features may also set forth various Know Your Customer (KYC) requirements for service providers to collect and verify legal consents, declarations, and identity details from their respective customers or users before enabling access to such features. Such information may be exchanged via a graphical user interface (GUI) of the application executable at the user's device.

The transaction workflow for conducting different stages of a KYC transaction or other transaction associated with the online service may be provided as an electronic flow of content pages displayed within the GUI over the different stages of the transaction. The content associated with such a transaction flow may include dynamic content that is acquired in real time or on demand from an independent or third-party content source separate from the service provider. The user experience associated with the transaction flow may be dictated by the quality of the content displayed on each content page for a corresponding stage of the transaction. However, dynamic content associated with the transaction flow may be updated by the content source at any time without knowledge of the service provider. Also, different users of the online service may view the dynamic content using a variety of hardware and software platforms. Consequently, it may be difficult for the service provider to maintain a seamless or consistent user experience in which the dynamic content for the transaction flow is properly displayed across different user devices and platforms.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

Figure 1:
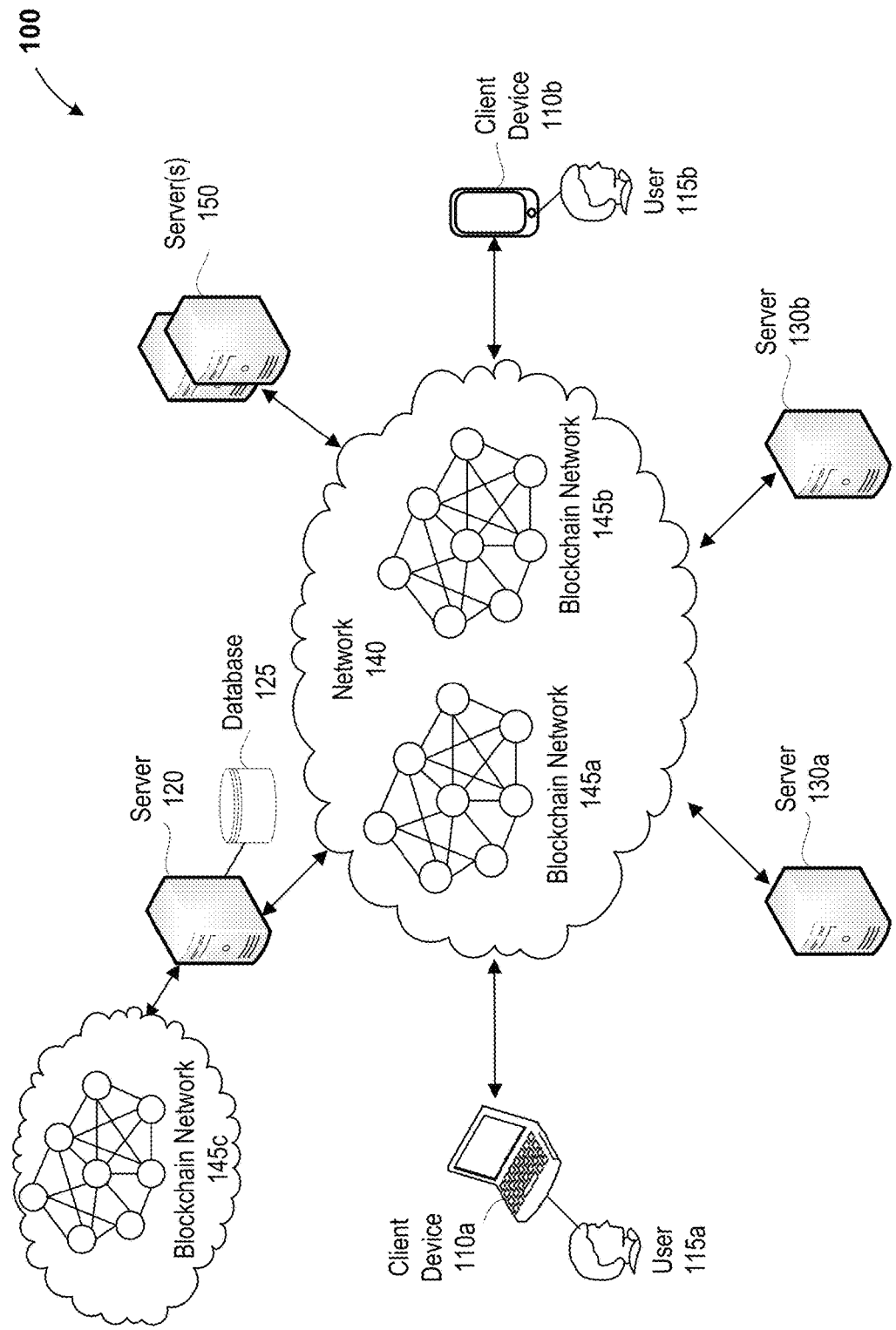
FIG. 1 is a block diagram of a distributed client-server system for facilitating transactions over one or more networks, in accordance with one or more embodiments of the present disclosure.

Embodiments of the present disclosure are directed to content distribution and management using artificial intelligence. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Further, when a particular feature, structure, or characteristic is described in connection with one or more embodiments, it is submitted that it is within the knowledge of one skilled in the relevant art to implement such feature, structure, or characteristic in connection with other embodiments whether or not explicitly described. It would also be apparent to one of skill in the relevant art that the embodiments, as described herein, can be implemented in many different embodiments of software, hardware, firmware, and/or the entities illustrated in the drawings. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to provide an artificial intelligence (AI) engine for content distribution and management. In some embodiments, the AI engine may be part of a visual regression framework that uses visual AI to perform visual regression testing of a digital or online user experience across different user devices. The user experience may be an interface designed by a service provider for conducting different stages of a transaction initiated by a user via a graphical user interface (GUI) of an application executable at a device of the user. For example, the user experience may be in the form of a transaction flow including a sequence of content pages to be displayed within the GUI of the application over the different stages of the transaction. The application in this example may be a web browser or a native application for accessing various features of an online service provided by the service provider.

In some embodiments, the transaction flow may be for a Know Your Customer (KYC) transaction for ensuring compliance with one or more rules governing the online service. Such rules may include, for example, laws or regulations that require the service provider to collect and verify legal consents, declarations, and identity details from users of the online service. Failure to comply with such KYC regulations may result in fines being imposed against the service provider. Therefore, it is critical for the content presented to users as part of a KYC transaction flow to be displayed correctly and consistently across different content channels (e.g., web vs. native), software applications (e.g., different types of web browsers and operating systems), and user devices (e.g., mobile vs. desktop). However, the content associated with such a KYC flow is typically generated by disparate content authoring teams operating in different locations and independently from one another and the service provider.

The same is true for any content associated with any transaction flow and acquired from an independent content source for display at the user device in real time or on demand, e.g., in response to a request for a transaction initiated by the user. For example, a content author or third-party content source can make updates or changes to the content at any time without the knowledge or control of the service provider and without adequately accounting for different user device configurations. Consequently, such changes may introduce content fit issues when the content is displayed as part of a transaction flow at the user device. Examples of such content fit issues include, but are not limited to, truncation (where a portion of the content is truncated or not displayed) and overflow (where a portion of the displayed content falls outside of the boundaries of a specified area, e.g., a designated content display area or container). The term "dynamic content" is used herein to refer broadly and inclusively to any content that may be acquired by a service provider in real time or on demand from a content source (or author) and that may be changed or updated by the content source at any time, e.g., on a frequent or periodic basis.

To avoid poor user experiences and service delays (and regulatory fines in the context of KYC flows) caused by issues associated with displaying such dynamic content, the service provider may validate the content to ensure there are no content fit issues that would prevent the content from being displayed properly at the user device during a transaction flow. Conventional techniques for content validation and distribution tend to use a best-effort approach, which fails to provide adequate support for dynamic content, including content that may change frequently or on a periodic basis, across the various hardware and software configurations of different user devices with different display screen sizes and/or display screen resolutions. To overcome the limitations of such conventional techniques, the disclosed content distribution and management techniques utilize a visual regression framework with an AI engine (also referred to herein as "a visual AI engine") to validate dynamic content acquired from a content source in real time before the content is released for display at a user device.

In some embodiments, the visual regression framework may use the AI engine to simulate the user experience associated with a transaction flow and perform content fit validation to ensure that dynamic content associated with the transaction flow will be properly displayed within the GUI at the user device. The transaction flow may include, for example, at least one content page with a user interface (UI) element that is tagged with content metadata indicating to the AI engine that the content associated with the UI element includes dynamic content that requires visual regression testing for content fit validation. The content metadata may identify a source of the dynamic content and a baseline specification for a content display area of the tagged UI element on the at least one content page. The baseline specification may define boundaries for a length and a width of the content display area, which may be customized for a software and hardware configuration of the user device.

As part of the visual regression testing, the AI engine may simulate a visual layout of the tagged UI element with the dynamic content acquired from the source and displayed on the at least one content page via the GUI of the application at the user device. Visual features of the dynamic content relative to the content display area of the tagged UI element may then be extracted from the simulated visual layout and used to validate the dynamic content when the extracted visual features match corresponding features of the content display area according to the baseline specification. In some embodiments, the visual regression testing using the AI engine may be implemented as part of a content management service provided by the service provider alongside other online services for validating and distributing dynamic content associated with transaction flows at different user devices. Unlike conventional content distribution techniques, the disclosed techniques may be used to provide a consistent user experience across the various software and hardware configurations of the different user devices.

The terms "online service," "web service," and "web application" are used interchangeably herein to refer broadly and inclusively to any type of website, application, service, protocol, framework (or relevant portion thereof), e.g., as implemented at a "back-end" server and accessible over a network via a client or "front-end" application executable at a computing device of a user. Embodiments of the present disclosure will be described in detail below with reference to FIGS. 1-15. While various embodiments of the present disclosure will be described in the context of an electronic or online payment processing service, it should be appreciated that embodiments are not intended to be limited thereto and that the disclosed content distribution and management techniques may be applied to any type of web service or web application provided over a network.

FIG. 1 is a block diagram of a distributed client-server system 100 for facilitating transactions over one or more networks, in accordance with one or more embodiments of the present disclosure. As will be described in further detail below, such transactions may include, for example, payment transactions facilitated by a service provider for the purchase of goods and services from an online marketplace. Such transactions may also include blockchain based transactions involving one or more smart contracts associated with the service provider. As shown in FIG. 1, system 100 includes a client device 110a, a client device 110b, a server 120, a server 130a, a server 130b, and one or more server(s) 150, all of which are communicatively coupled to one another via a network 140. Client devices 110a and 110b may be different types of computing devices having at least one processor, a local memory, a display, and one or more user input devices (e.g., a keyboard and a microphone). Examples of such computing devices include, but are not limited to, a mobile phone, a tablet computer, a laptop computer, a desktop computer, or a workstation. In the example of FIG. 1, client device 110a may be a laptop computer of a user 115a while client device 110b may be a mobile phone, e.g., a smart phone, of a user 115b. Each of servers 120, 130a, 130b, and 150 may be any of various types of computer servers, e.g., a cluster of computers in a server farm, capable of communicating or serving data to one another and to other computing devices, including client devices 110a and 110b via network 140.

Network 140 may be any network or combination of networks that can support data communications. Such a network may include, but is not limited to, a wired (e.g., Ethernet) or a wireless (e.g., Wi-Fi or cellular) network. In addition, network 140 may include, but is not limited to, a local area network, a medium area network, and/or a wide area network, such as the Internet. Network 140 may support any of various networking protocols and technologies. Examples of such protocols include, but are not limited to, TCP/IP, Ethernet, FTP, HTTP, and any other Internet or World Wide Web protocol. Such technologies may include, for example, any of various wireless communication technologies including, but not limited to, GSM, CDMA, Wi-Fi, and LTE. Intermediate network routers, gateways, or servers may be provided between components of system 100 depending upon a particular application or environment. It should be appreciated that the network connections shown between the computing devices in FIG. 1 are illustrative and the communications links between these devices may be established in any of various ways, as desired for a particular implementation.

In some embodiments, system 100 may also include one or more distributed or peer-to-peer (P2P) networks, such as blockchain networks 145a, 145b, and 145c (collectively referred to as "blockchain networks 145"). Blockchain networks 145a and 145b may be public blockchain networks included within network 140. Blockchain network 145c may be, for example, a separate private blockchain network connected to server 120. The private blockchain network and server 120 in this example may be associated with a service provider. In some implementations, the service provider may use server 120 to facilitate various blockchain based transactions for users of the service provider, e.g., users 115a and 115b of client devices 110a and 110b, respectively. A blockchain based transaction may involve, for example, a transfer of data or value between different entities or users, such as user 115a of client device 110a and user 115b of client device 110b in FIG. 1. Server 120 may include one or more applications, for example, a transaction application to facilitate the transaction between the entities by utilizing a blockchain associated with one or more of blockchain networks 145. For example, user 115a may initiate the transaction via the GUI of an application executable at client device 110a. This may cause client device 110a to send a request for the transaction to server 120. Server 120 may in turn forward the requested transaction to one of blockchain networks 145 to be validated and approved. Each blockchain network 145 in this example may comprise a plurality of interconnected devices (or nodes).

In its broadest sense, the term "blockchain" refers to a framework that supports a trusted ledger that is stored, maintained, and updated in a distributed manner in a peer-to-peer network. Such a distributed ledger may be used, for example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities. By using a digital currency exchange, a user may buy any value of digital currency or exchange any holdings in digital currencies into worldwide currency or other digital currencies. Each transaction can be verified by the distributed ledger and only verified transactions are added to the ledger. (Note that other digital asset transfers are enabled by other blockchain schemes as well; cryptocurrency examples are used variously herein for ease of illustration and understanding.) The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Although the use of a distributed ledger for maintaining cryptocurrency transactions may be the most recognizable use of blockchain technology today, it should be appreciated that such a ledger may be used in a variety of different applications and fields other than cryptocurrency. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser. Other data as well as other digital assets may be maintained, recorded, and/or transferred according to various blockchain schemes.

In addition to facilitating blockchain based transactions, the service provider in this example may use server 120 to provide one or more online or web services. For example, server 120 may be used to provide a payment processing service of the service provider for processing payments involving traditional payment methods (e.g., cash, credit cards, debit cards, checks, money orders, and the like). Such payments may be processed in connection with online transactions between different entities via network 140. The transactions may include, for example, purchases or money transfers between different users of the service provider. It should be appreciated that the term "users" herein may refer to any individual or other entity (e.g., a merchant or other online service provider) who uses or requests access to use the web service(s) of the service provider. In FIG. 1, for example, user 115*a* of device 110*a* may initiate a transaction for the purchase of one or more items sold by a merchant at a physical store or via an online marketplace hosted at server 130*a* or 130*b* over network 140. The online marketplace in this example may be accessed by user 115*a* via a web browser or other client application executable at device 110*a*. The online marketplace may provide a checkout option for user 115*a* to select the payment processing service offered by the service provider at server 120 to complete payment for the purchase. By selecting this option, user 115*a* may initiate a payment transaction for transferring funds to the merchant from a specified bank account, digital wallet, or other funding source associated with an account of user 115*a* with the service provider. The payment processing service may assist with resolving electronic transactions through validation, delivery, and settlement of account balances between user 115*a* and the merchant in this example, where accounts may be directly and/or automatically debited and/or credited using monetary funds in a manner accepted by the banking industry.

It should be appreciated that access to features of the web service (e.g., payment processing service) may be restricted to only those users who have accounts registered with the service provider. Therefore, user 115*a* may be required to provide authentication credentials for either logging into an existing account or registering a new account with the service provider, e.g., via an account login page or new account registration page served by server 120 and displayed at device 110*a*. The authentication credentials may be stored along with other relevant account information, e.g., name and other identity attributes, associated with user 115*a*'s account, in a database 125 coupled to or otherwise accessible to server 120. Database 125 may be any type of data store or recordable storage medium configured to maintain, store, retrieve, and update information for server 120. In some implementations, a similar account authentication scheme may be employed by the merchant associated with server 130*a* to authenticate user 115*a* for transactions involving the purchase of items from the merchant's online marketplace.

As will be described in further detail below with respect to FIG. 2, the service provider may also use server 120 to implement a content management service, e.g., as part of an automated content validation and distribution system for validating content associated with a content page of a transaction flow for conducting different stages of a transaction via a GUI at device 110*a* and/or 110*b*. The content may include dynamic content acquired from a content author or source associated with server(s) 150. For example, the content management service at server 120 may communicate with server(s) 150 over network 140 to acquire content associated with a tagged UI element of at least one content page of the transaction flow. It should be appreciated that the content management service in this example may operate alongside other services (e.g., the payment processing service) offered by the service provider to ensure the content acquired from the content source (e.g., via an interface of a content authoring application hosted at one or more of server(s) 150) for the transaction flow is properly displayed at each user's device. In some cases, the transaction flow may be for a KYC transaction for enforcing compliance with business or legal rules governing the online service. As described above, such rules may include, for example, laws or regulations that require the service provider to collect and verify legal consents, declarations, and identity details from the users of the online service.

It should be appreciated that embodiments of the present disclosure are not limited to KYC transactions and that the disclosed embodiments may be used to distribute content for any type of transaction (including financial and non-financial transactions) that can be experienced by a user via a GUI of an application at the user's device. For example, the transaction flow may include an electronic flow for a transaction experienced by the user as a flow of web pages in which dynamic content associated with the UI elements of the respective pages are used to provide a customized user experience as the transaction is conducted. It should also be appreciated that embodiments may be applied to any type of workflow experienced by the user via a GUI of an application, including those unrelated to a transaction. A workflow for a non-transaction-related user experience may include, for example, a workflow for a gaming application, a workflow for a social media application, or other workflow for performing tasks in an application that do not necessarily involve a transaction.

Figure 2:
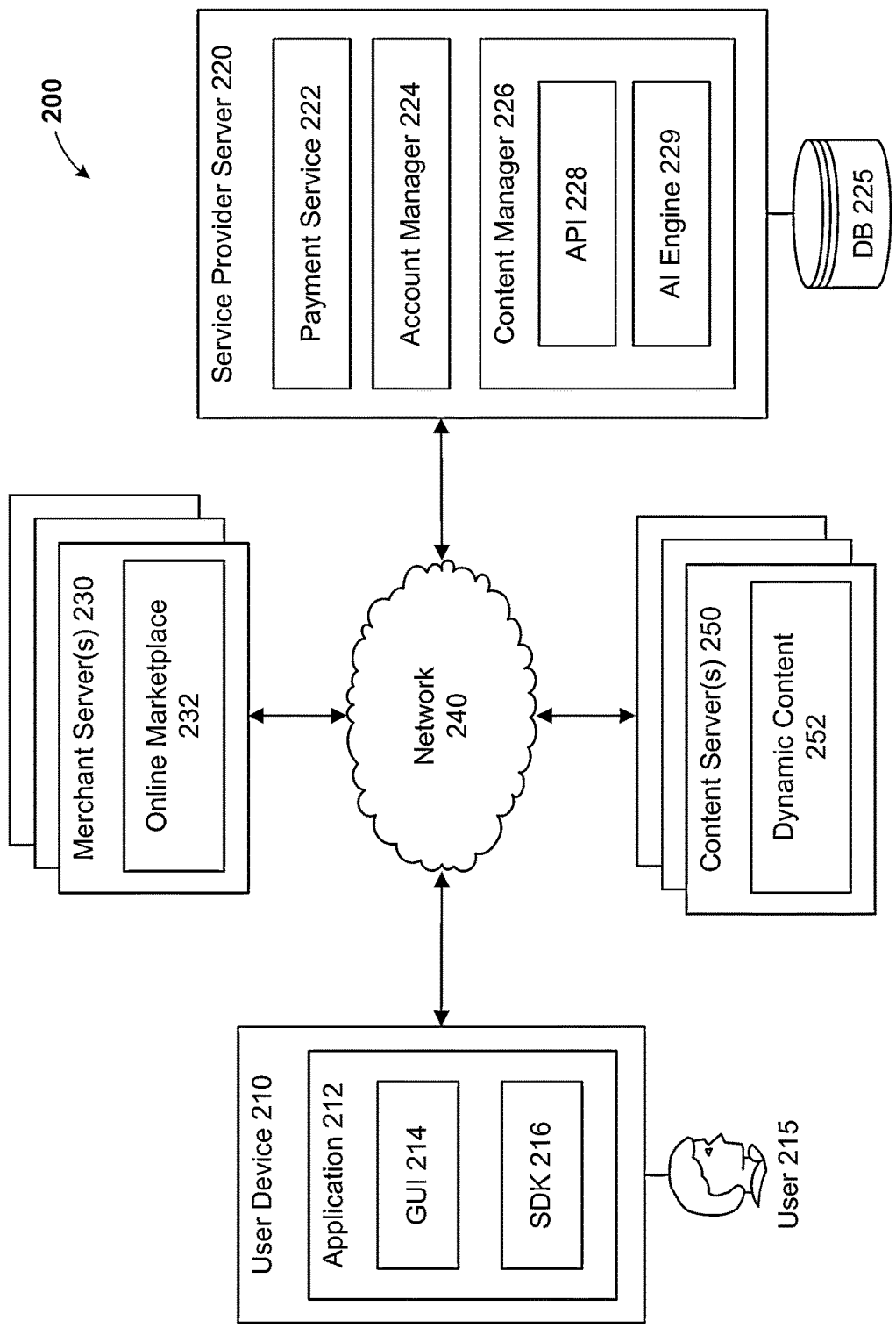
FIG. 2 is a block diagram of a network communication system for content distribution and management, in accordance with one or more embodiments of the present disclosure.

FIG. 2 is a block diagram of a network communication system 200 for content distribution and management, in accordance with one or more embodiments of the present disclosure. As shown in FIG. 2, system 200 includes a user device 210, a service provider server 220, one or more merchant servers 230, and one or more content servers 250. Each of content server(s) 250 in this example may be associated with a third-party content source, e.g., a legal authority that publishes or prescribes rules governing an online service (e.g., a payment service 222) of a service provider, as will be described in further detail below. For discussion purposes, system 200 will be described using system 100 of FIG. 1, as described above, but system 200 is not intended to be limited thereto. User device 210 may be implemented using, for example, client device 110*a* or 110*b* of FIG. 1, as described above. Service provider server 220 may be implemented using, for example, server 120 of FIG. 1, as described above. Merchant server(s) 230 may be implemented using, for example, merchant servers 130*a* and 130*b* of FIG. 1, as described above. Content server(s) 250 may be implemented using, for example, content server(s) 150 of FIG. 1. User device 210 along with servers 220, 230, and 250 may be communicatively coupled to one another via a network 240. User device 210 and each of servers 220, 230, and 250 may be implemented using any appropriate combination of hardware and software configured for wired and/or wireless communication over network 240. Network

240 may be implemented using, for example, network 140 of FIG. 1, as described above.

In some embodiments, user device 210 executes an application 212 that a user 215 may use to access the functionality of one or more online or web services via network 240. The web services may include, for example, payment service 222 provided by the service provider using service provider server 220. In some embodiments, the service provider may be an online payment service provider or payment processor, and payment service 222 may include various payment processing services for facilitating transactions between different entities or users of payment service 222. Such transactions may include, for example, payment transactions between user 215 and an online merchant for the purchase or sale of a product from an online marketplace 232 hosted at a corresponding one of merchant server(s) 230. Examples of payment processing services offered by the service provider as part of payment service 222 include, but are not limited to, user account establishment and management, fund transfers, digital wallet services, and reimbursement or refund services.

Service provider server 220 may be configured to maintain accounts for the different entities or users of payment service 222 (e.g., user 215 and the merchant(s) associated with merchant server(s) 230). The account and associated information for each entity/user may be stored in a database (DB) 225 coupled to service provider server 220. In some embodiments, the account information stored in DB 225 may be managed by an account manager 224 of service provider server 220. DB 225 may be any type of data store for storing information accessible to service provider server 220. DB 225 may be implemented using, for example, database 125 of FIG. 1, as described above. In some embodiments, account information for each registered user of the service provider may be stored in DB 225 with a unique identifier and other relevant information corresponding to each user account registered with the service provider. Such account information may include, for example and without limitation, login credentials (e.g., username and password information), personal contact information (e.g., mailing address and phone numbers), banking information (e.g., bank account numbers and other private financial information related to one or more funding sources, such as digital wallets), and other identity attributes (e.g., Internet Protocol (IP) addresses, device information, etc.). In addition to user account information, DB 225 may also be used to store content for different content pages of a transaction flow, as will be described in further detail below.

In some embodiments, user 215 may use application 212 to provide login credentials and any other account information that may be required for user 215 to access different features of payment service 222. Application 212 may be any of various application programs (e.g., a web browser, a native payment service application, etc.) that provides an interface at user device 210 for user 215 to access the features of payment service 222 and perform various tasks. Such tasks may include, for example, initiating one or more transactions with payment service 222, for example, a payment transaction for the purchase of an item from online marketplace 232 of a merchant, as described above. User 215 may perform such tasks by interacting with a graphical user interface (GUI) 214 of application 212 using a pointing device (e.g., a mouse) coupled to user device 210. For example, user 215 may initiate a transaction by interacting with user interface (UI) elements of a content page provided via a graphical user interface (GUI) 214 of application 212 using a pointing device (e.g., a mouse) coupled to user device 210. User 215's interactions with GUI 214 for each transaction may produce multiple communications between user device 210 and service provider server 220 and/or merchant server(s) 230 over network 240. Such network communications may include, for example, various types of requests (e.g., payment transaction requests) that require access to features of payment service 222 and/or online marketplace 232, respectively. It should be appreciated that any of various network or other communication protocols may be used for sending and receiving different types of requests and other communications to and from user devices and applications, as desired for a particular implementation.

In some embodiments, service provider server 220 may receive a request for a transaction from application 212 at user device 210 via network 240. In response to receiving the request, service provider server 220 may use a content manager 226 to determine a transaction flow for conducting different stages of the transaction via GUI 214 of application 212. As described above, the transaction flow may include a sequence of content pages to be displayed within GUI 214 over the different stages of the transaction. In some embodiments, the transaction flow may include at least one content page with a UI element that is tagged with content metadata indicating that the content associated with the UI element includes dynamic content. The content metadata may identify, for example, a source of the dynamic content (e.g., content server(s) 250) and a baseline specification for a content display area of the tagged UI element on the at least one content page. Tagging UI elements of one or more content pages in the transaction flow may help content manager 226 identify the portions of the user experience affected by dynamic content or content that may be prone to frequent or periodic updates. Such content may require validation or testing using AI engine 229 to ensure the content will be displayed as expected within GUI 214 of application 212 at user device 210, i.e., without any content fit issues, such as truncation or overflow, when the content is displayed as part of the transaction flow at user device 210.

In some embodiments, content manager 226 may include an application programming interface (API) 228 and an artificial intelligence (AI) engine 229. As will be described in further detail below, API 228 may operate in conjunction with AI engine 229 to determine suitable content for a tagged UI element of at least one content page in the transaction flow based on a hardware and software configuration of user device 210. API 228 may also be used to interact with user 215 via one or more UI elements of each content page displayed within GUI 214 of application 212 at user device 210. It should be appreciated that any of various communication protocols (e.g., HTTP, RESTAPI, SOAP, etc.) may be used as desired for a particular implementation.

In some embodiments, a software development kit (SDK) 216 may communicate with API 228 to provide device metadata identifying the software and hardware configuration of user device 210. SDK 216 may be invoked by application 212 and/or GUI 214 during use of and/or interaction with such components by a user utilizing user device 210. Thus, API 228 may obtain the device metadata from application 212 and/or GUI 214. While SDK 216 is shown in FIG. 2 as a component of application 212, it should be appreciated that SDK 216 may be implemented as either an integrated component of application 212 or as a separate application or software module that is executable alongside application 212 at user device 210. In some implementations, the device metadata may be collected by SDK 216 and included in the transaction request sent from application 212 to service provider server 220 via network 240, as described above. The device metadata may include, for example and without limitation, a device type, an operating system, an application type, a display screen size, a display screen resolution, a device location, and any other metadata that may be used to identify the software and hardware configuration of user device 210.

The content associated with one or more content pages of the transaction flow may include, for example, dynamic content 252 acquired via API 228 from one or more content server(s) 250 over network 240. Content server(s) 250 may be associated with any of various content authors or sources. Such a content source may be, for example, an independent or third-party content source that is separate from the service provider associated with service provider server 220. Dynamic content 252 may include, but is not limited to, text, graphics, multimedia content, programming code, or any combination thereof. Dynamic content 252 may be acquired from content server(s) 250 and provided for display within GUI 214 of application 212 at user device 210 in real time or on demand, e.g., in response to the transaction request from application 212 or during a corresponding stage of the transaction being conducted via GUI 214. While not shown in FIG. 2, it should be appreciated that content server(s) 250 may include a content authoring application for generating dynamic content 252 and/or interfacing with API 228 of content manager 226 for providing dynamic content 252 over network 240.

It should be appreciated, however, that the content provided to user device 210 may also include static (e.g., pre-generated) content or a combination of both dynamic and static content. For example, a content page in the transaction flow may include a combination of static content, e.g., based on a statically defined template or programming code stored in DB 225, and dynamic content 252 acquired from content server(s) 250 over network 240 in real time. The transaction flow may be, for example, one of a plurality of transaction flows corresponding to different types of transactions. Each transaction flow in this example may be defined by a corresponding template that specifies the number of content pages included in the flow, the order of these pages, and the type and layout of the content and user interface (UI) elements to be displayed on each page. Based on the type of transaction initiated by user 215 via GUI 214, content manager 226 may determine a suitable transaction flow and select a corresponding template for that transaction flow.

In some embodiments, AI engine 229 may perform content fit validation by simulating a visual layout of the tagged UI element with dynamic content 252 acquired from content server(s) 250 and displayed on the at least one content page via GUI 214 of application 212 at user device 210. AI engine 229 may extract visual features of dynamic content 252 relative to the content display area of the tagged UI element from the simulated visual layout, and only validate dynamic content 252 when the extracted visual features match corresponding features of the content display area according to the baseline specification. While not shown in FIG. 2, it should be appreciated that content manager 226 may also include a simulator for performing the simulations. The simulator may be used to simulate the visual layout of dynamic content within the content display area of the tagged UI element as displayed for a variety of software and hardware configurations across different user devices. The simulated visual layout may vary according to the software and hardware configuration of each user device, e.g., as identified by the device metadata included in the transaction request received from the device, as described above.

In some embodiments, content manager 226 may be used to implement a content management service that operates alongside other web services (e.g., payment service 222) at service provider server 220. The content management service may include, for example, a visual regression framework that uses AI engine 229 to appropriately validate dynamic content across the various hardware and software configurations of different user devices. In some embodiments, the visual regression framework may be part of a larger application framework including various content workflows (or content flows) for content distribution and management using AI, as will be described in further detail below with respect to FIG. 3.

Figure 3:
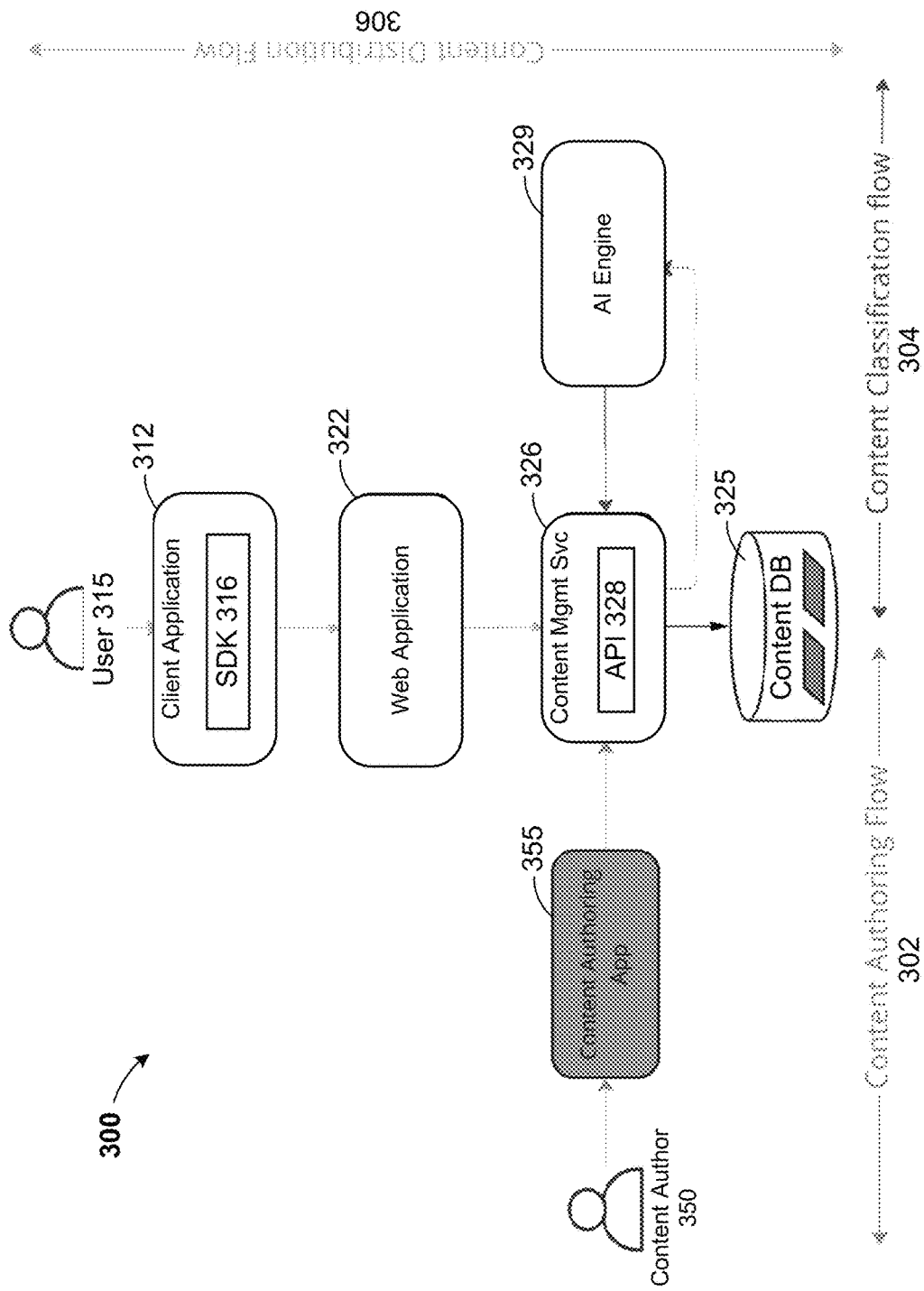
FIG. 3 is a block diagram of an application framework for a device-aware content distribution and management using an artificial intelligence (AI) engine, in accordance with one or more embodiments of the present disclosure.

FIG. 3 is a block diagram of an application framework 300 for device-aware content distribution and management using an AI engine, in accordance with one or more embodiments of the present disclosure. For discussion purposes, application framework 300 will be described using system 200 of FIG. 2, as described above, but is not intended to be limited thereto. While not shown in FIG. 3, it is assumed for purposes of this example that the various applications and services within framework 300 are executable at different computing devices, which are communicatively coupled to one another via a network (e.g., network 240 of FIG. 2, as described above). Such computing devices may include, for example, user device 210, service provider server 220, and content server(s) 250 of FIG. 2, as described above. For example, the applications and services of framework 300 may be implemented using corresponding applications and services executable at the computing devices (e.g., user device 210, service provider server 220, and content server(s) 250) in system 200 of FIG. 2.

As shown in FIG. 3, framework 300 includes a client application 312 (e.g., application 212 of FIG. 2, as described above) that enables a user 315 (e.g., user 215 of FIG. 2) to initiate or conduct transactions associated with a web application or service 322 (e.g., payment service 222 of FIG. 2) via a network (e.g., network 240 of FIG. 2, as described above). Web application 322 in this example may operate alongside a content management service 326 (e.g., content manager 226 of FIG. 2) to distribute content acquired from a content source or author 350 via a content authoring application 355 executable at a device or server associated with content author 350 (e.g., content server(s) 250 of FIG. 2). Content management service 326 may use a content AI engine 329 (e.g., AI engine 229 of FIG. 2) to provide a consistent user experience for various transaction flows across different types of user devices. In some embodiments, the transaction flows may include a KYC transaction flow for performing different stages of a KYC transaction for ensuring compliance with one or more rules governing an online service (e.g., payment service 222 of FIG. 2, as described above). Such rules may include, for example, laws or regulations that require the service provider to collect and verify legal consents, declarations, and identity details from users of the online service.

While AI engine 329 is shown separately from content management service 326 in FIG. 3, it should be appreciated that AI engine 329 may be implemented as a component of content management service 326, e.g., similar to AI engine 229 of content manager 226 implemented at service provider server 220 of FIG. 2, as described above. Also, while only user 315 is shown in FIG. 3, it should be appreciated that content management service 326 of framework 300 may be used to distribute content to additional users for display at the respective user devices as part of a transaction flow. In contrast with conventional content distribution services, content management service 326 may be used to identify content that is most suited to the hardware and software configuration of each user's device and thus, avoid the content fit issues, such as truncation or overflow, which lead to a sub-optimal experience for some users.

In some embodiments, the operations performed by content management service 326 may be associated with different content workflows (or content flows) for content distribution and management within framework 300. Such content flows may include, for example, a content authoring flow 302, a content classification flow 304, and a content distribution flow 306, as will be described in further detail below.

Content authoring flow 302 may include operations for acquiring content from content author 350 and storing the acquired content in a content database 325 (e.g., DB 225 of FIG. 2, as described above). The content may be acquired via a content authoring application 355 (or associated interface) executable at a device of content author 350 (e.g., content server(s) 250 of FIG. 2, as described above). Content author 350 may be, for example, an independent or third-party content source that is separate from the service provider associated with content management service 326. Alternatively, content author 350 may be an employee of the service provider (e.g., a member of the service provider's legal policy team or legal department) or a contractor associated with content management service 326. Content authoring application 355 may be any of various applications that content author 350 may use to generate different types of content. In some implementations, content management service 326 may use an API 328 (e.g., API 228 of FIG. 2, as described above) to acquire the content from content author 350 (or content authoring application 355 thereof) and distribute the acquired content for display to user 315 via a GUI of client application 312, as will be described in further detail below. In some embodiments, the content acquired from content author 350 as part of content authoring flow 302 may include different content variants generated by content author 350. The content variants may include, for example, different versions of the same content (e.g., dynamic content 252 of FIG. 2, as described above), which has been adapted for various display screen sizes and/or resolutions associated with different types of user devices.

The acquired content variants may then be classified by content management service 326 as part of content classification flow 304. In some embodiments, content management service 326 may use AI engine 329 to classify each of the acquired content variants for a plurality of device configurations. The device configurations may be representative of, for example, the various hardware and software configurations of the user devices associated with known users of the service provider, e.g., users who have accounts registered with the service provider, as described above. Each content variant may be stored in content database 325 with content metadata including a baseline specification for a content display area of a tagged UI element on at least one content page of a relevant transaction flow in which the content variant is to be displayed. The baseline specification may define the boundaries of the content display area of the tagged UI element on the content page.

In some implementations, AI engine 329 may classify the content variants based on simulations of the user experience with each content variant displayed on the at least one content page for the various device configurations. The simulations may reveal that certain content variants cause content fit issues, such as truncation or overflow, when displayed for a particular device configuration. Accordingly, AI engine 329 may determine at least one recommended device configuration for each content variant when no content fit issues are detected in the simulated display of that content variant for the at least one device configuration. While not shown in FIG. 3, it should be appreciated that AI engine 329 may include any of various trained machine learning or neural network models, e.g., a convolutional neural network (CNN), for performing the classification and feature extraction operations described herein.

In some embodiments, the baseline specification stored with each content variant in content database 325 may be customized for the device configuration(s) recommended by AI engine 329 for that content variant based on the classification. For example, AI engine 329 may generate the customized baseline specification for each content variant and update the content metadata stored for that content variant in content database 325 accordingly. As will be described in further detail below, AI engine 329 may perform additional simulations to validate the content (e.g., one or more content variants selected from those stored in content database 325) for a specific software and hardware configuration of a user device, e.g., as part of content distribution flow 306.

Content distribution flow 306 may include operations for distributing suitable content to users of web application 322 according to their respective device configurations. For example, content management service 326 may distribute content associated with a tagged UI element of a content page to be displayed within a GUI of client application 312 used to access features of web application 322 at a device of user 315 (e.g., user device 210 of FIG. 2, as described above). The content page may be part of a sequence of content pages included in a transaction flow for conducting different stages of a transaction. The transaction may be any of various transactions, e.g., a KYC transaction, initiated by user 315 for performing one or more tasks associated with web application 322, as described above. The transaction and/or content page may also be associated with a credit or loan application and corresponding user experience, which may present dynamic content via the sequence of content pages through web application 322. Such dynamic content may include interest rates, fees, penalties, and the like that are presented to a customer. A further exemplary embodiment may include use of an e-commerce application or website via web application 322 that may display promotion codes, discounts, and other additional details to a customer via dynamic content in the sequence of content pages. Accordingly, the content may be provided by content management service 326 to client application 312 in response to a request for the transaction received from client application 312. The request may be received via, for example, API 328 or other interface of content management service 326 associated with web application 322. Such an interface may also be used, for example, to interact with user 315 via one or more UI elements of each content page displayed within the GUI of application 312.

In some embodiments, the transaction request from client application 312 may include device metadata identifying a software and hardware configuration of the user device, as described above. The device metadata in this example may be collected by an SDK 316 (e.g., SDK 216 of FIG. 2, as described above) executable at the user device alongside or as a part of client application 312. In some implementations, SDK 316 may collect the device metadata and pass it to application 312 for loading dynamic content associated with a tagged UI element of at least one content page to be displayed during a corresponding stage of the transaction. The dynamic content may be provided by content management service 326 as part of the user experience managed by web application 322 for the particular transaction being conducted.

In some embodiments, content management service 326 may load different variants of the dynamic content, e.g., as acquired from content author 350 and/or stored in content database 325. Content management service 326 may use AI engine 329 to select at least one of the content variants stored in content database 325 for a device configuration corresponding to the software and hardware configuration identified by the device metadata for the user device. For example, each of the content variants may be stored in content database 325 with content metadata for at least one device configuration recommended by AI engine 329 based on the classification performed as part of content classification flow 304 described above. As described above, the content metadata associated with each content variant may include a baseline specification for a content display area of the tagged UI element, which is customized for the corresponding device configuration. Accordingly, AI engine 329 in this example may compare the device metadata with the content metadata associated with each of the content variants to identify and select the content variant that is most suited to the software and hardware configuration of the user device.

In some embodiments, AI engine 329 may use the baseline specification associated with the selected content variant to validate the content for the specific software and hardware configuration of the user device. For example, the content may be validated to ensure that the content classification works as expected and that the selected content variant will be displayed correctly within the GUI of client application 312 at user 315's device before the content is distributed by content management service 326 to user 315's device. This allows content management service 326 to provide a customized user experience in which the content to be displayed for the transaction flow at user 315's device is tailored to the software and hardware configuration of user 315's device.

As described above, the content associated with the transaction flow may be generated and/or updated by content author 350 at any time without the knowledge or control of the service provider. As changes to the content may be made by content author 350 without adequately accounting for different user device configurations, such changes may introduce content fit issues when the content is displayed as part of the transaction flow at user 315's device. Such content fit issues can lead to a poor user experience and service delays while the service provider works with content author 350 to make additional content updates as needed to resolve the issues. For example, the service provider may need to continually request content updates from content author 350 and attempt to validate the updated content until all content fit issues have been successfully resolved. To reduce the service delays associated with new or updated content, content management service 326 may be used to provide an automated real-time feedback loop that informs content author 350 of any content fit issues introduced by proposed content changes so that such issues can be resolved during the content authoring and review process without requiring further intervention by the service provider. An example of such a feedback loop will be described in further detail below with respect to FIG. 4.

Figure 4:
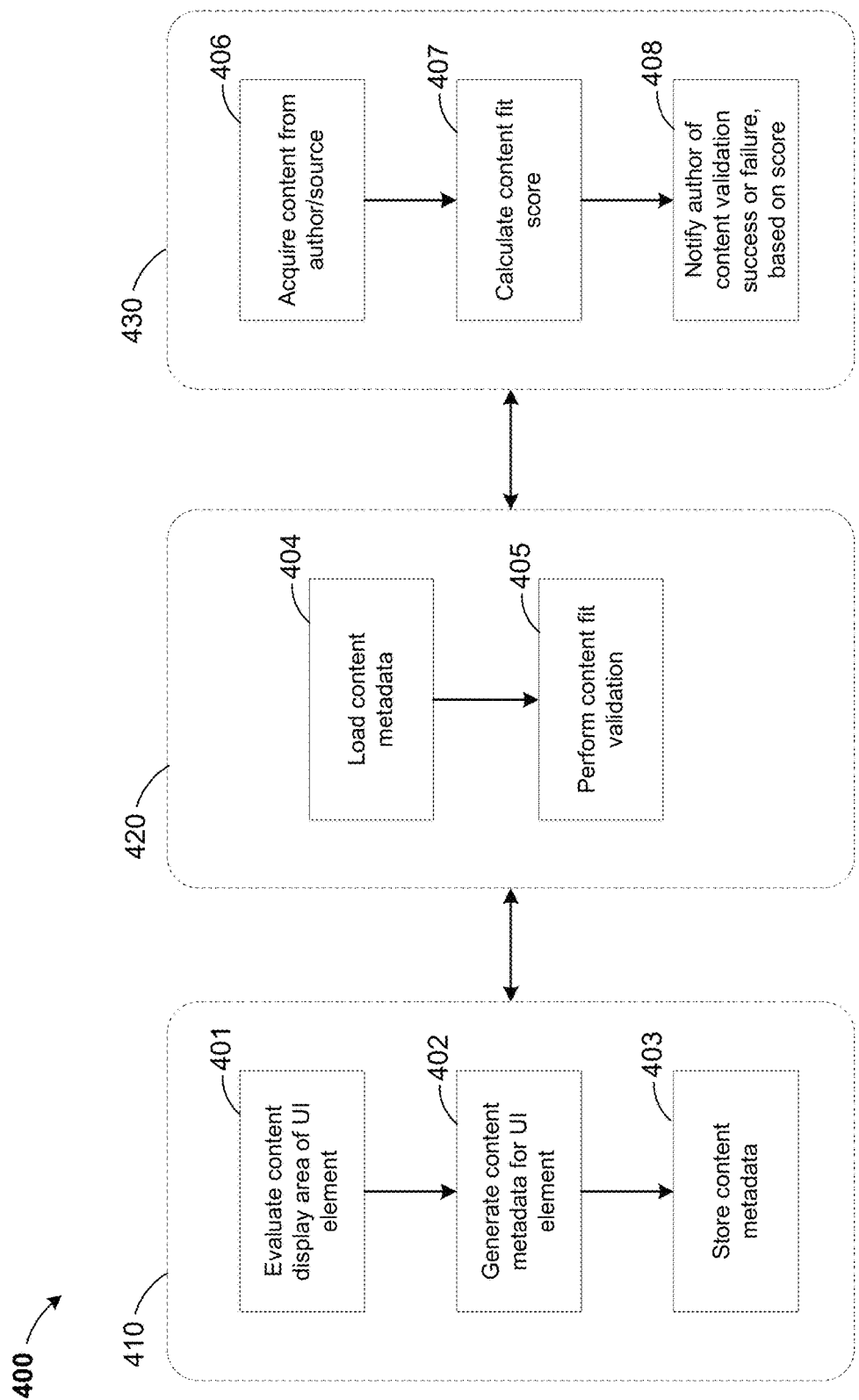
FIG. 4 is a flow diagram of a process for content fit validation with a real-time feedback loop for content authors, in accordance with one or more embodiments of the present disclosure.

FIG. 4 is a flow diagram of a process 400 for content fit validation with a real-time feedback loop for content authors, in accordance with one or more embodiments of the present disclosure. Process 400 may be performed by, for example, different components of content management service 326 of FIG. 3 or content manager 226 of FIG. 2, as described above. Such components may include a content metadata module 410, a content validation module 420, and a content authoring module 430. Referring to system 200 of FIG. 2, content metadata module 410, content validation module 420, and content authoring module 430 may be implemented as different service modules that are either integrated with or operate alongside content manager 226 at service provider server 220 of FIG. 2, as described above. Alternatively, modules 410, 420, and 430 may be implemented as separate services at either service provider server 220 or one or more other servers communicatively coupled to service provider server 220 via network 240.

In some embodiments, the operations corresponding to steps 401, 402, and 403 of process 400 may be performed by content metadata module 410 while the operations at steps 404 and 405 may be performed by content validation module 420, and the operations at steps 406, 407, and 408 may be performed by content authoring module 430. It should be appreciated, however, that process 400 may include additional operations than those shown in FIG. 4. It also should be appreciated that these operations may be performed in parallel or in a different order (e.g., by a different component) than that depicted in FIG. 4.

As shown in FIG. 4, process 400 may begin at step 401, which includes evaluating a content display area of a UI element to be displayed on at least one content page of a transaction flow at a user's device (e.g., via the GUI of application 312 at user 315's device in FIG. 3, as described above). In some embodiments, step 401 may include performing visual regression to evaluate the boundaries of the content display area associated with the UI element on the at least one content page.

Process 400 may then proceed to step 402, which includes generating and/or updating content metadata for the UI element based on the results of the evaluation or visual regression testing. In some implementations, the UI element may be tagged with content metadata identifying an author (e.g., content author 350 of FIG. 3, as described above) or source of the content to be displayed within the content display area. Accordingly, step 402 may include generating a baseline specification defining the boundaries for a length and a width of the content display area and updating the existing content metadata associated with the tagged UI element to include the baseline specification or a link thereto. In some implementations, the baseline specification may also be used to define predetermined limits for different types of content that can be displayed within the content display area (e.g., a predetermined maximum and/or minimum number of displayable text characters that the content display area can support without causing any issues affecting the user experience). In step 403 of process 400, a record of the content metadata including the baseline specification generated in step 402 for the tagged UI element may be stored within a data store (e.g., content database 325 of FIG. 3, as described above). The content metadata associated with the tagged UI element on the at least one content page may also be updated to include a link or reference to the corresponding memory address or storage location of the baseline specification.

The stored content metadata may be loaded in step 404 and used to perform content fit validation in step 405. The loaded metadata may also be used later to calculate a content fit score (in step 407) for content acquired from a content author or source (in step 406). The content fit score may represent, for example, how well the content fits within the boundaries of the content display area as defined by the baseline specification. In some embodiments, the content acquired from the author may be successfully validated if the content fit score meets a predetermined threshold (e.g., 95%). The predetermined threshold may be, for example, a value that represents a minimum required degree of similarity between the dimensions of the content and the boundaries of the content display area. In step 408, the author may be notified of the results of the content fit validation (i.e., either validation success or failure) based on whether the calculated content fit score meets the predetermined threshold.

In some embodiments, a content validation failure notification may be transmitted to the content author when the calculated content fit score fails to meet the predetermined threshold (e.g., falls below 95%). The notification may include, for example, the calculated score or other information that the author can use to make appropriate modifications to the content to resolve the content fit issues. In some implementations, content authoring module 430 may provide the author or content source with an interface for making such modifications or communicating with the service provider to request assistance or feedback with respect to the modifications (e.g., by engaging with an appropriate development team thereof). If the content score meets the threshold, it may be successfully validated and added to a content database for later distribution to users (e.g., as part of content distribution flow 306 in application framework 300 of FIG. 3, as described above). The validated content may also be provided to a user's device for display as part of a corresponding transaction flow.

As described above, the content that is validated and distributed to users may include dynamic content acquired by the service provider in real time or on demand from the author. Such content may include, for example, text content associated with contextual messages (e.g., help messages, error messages, tool tips, and other informational messages) as well as customer communication (e.g., account alerts, emails, push notifications, etc.). Referring back to FIG. 3, AI engine 329 of framework 300 may select the most appropriate content for display according to the particular device configuration (e.g., screen size and/or resolution) and/or communication channel (e.g., email vs. text message). In some embodiments, the dynamic content may include legal content, e.g., content associated with product disclosures, declarations, and consents, which may be presented to users as part of a transaction flow, e.g., for conducting different stages of a KYC transaction during an on-boarding or product provisioning process for users of the service provider. The transaction flow may include a sequence of content pages corresponding to different stages of the transaction to be conducted via a GUI of an application executable at a user's device, as will be described in further detail below with respect to FIG. 5.

Figure 5:
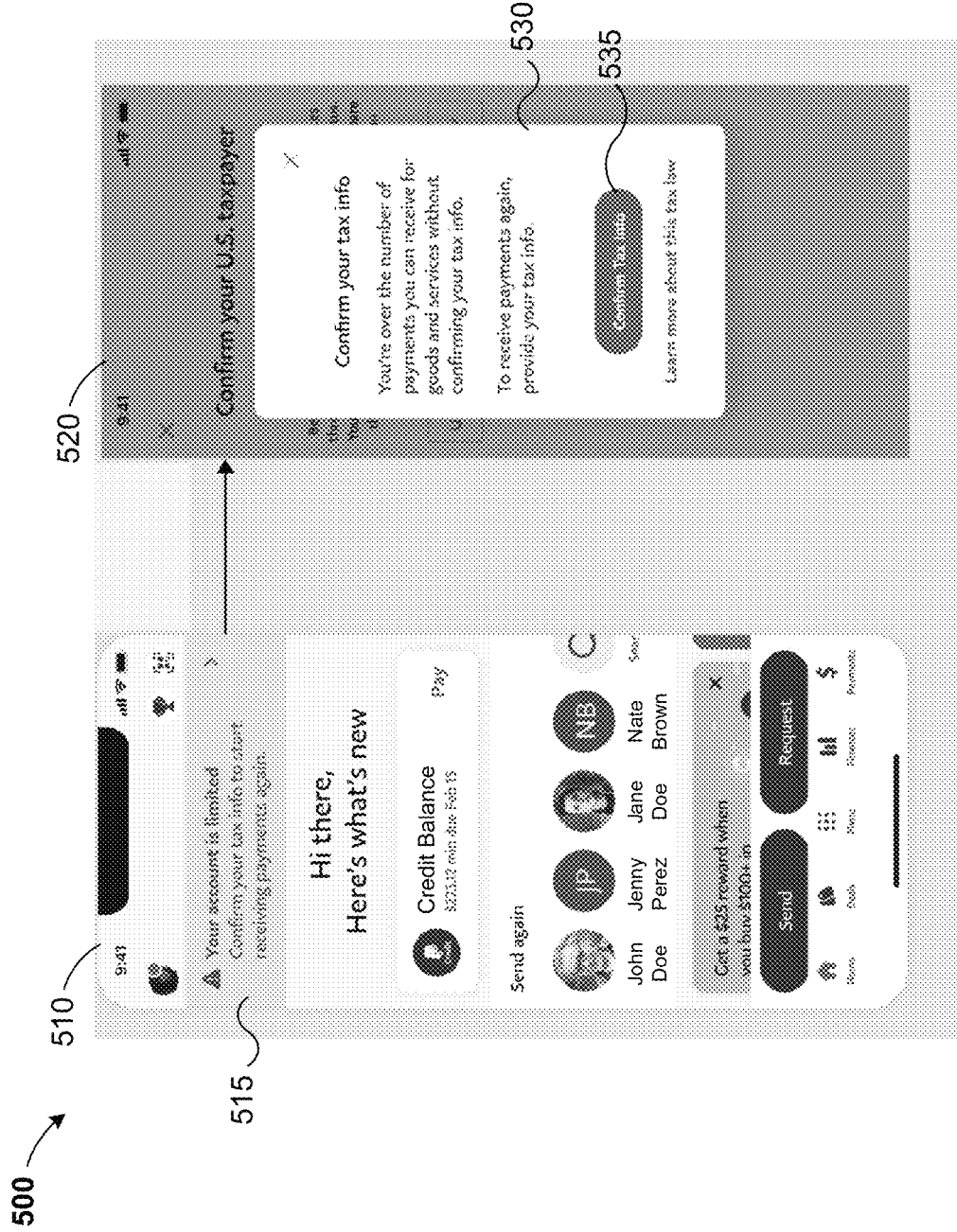
FIG. 5 illustrates various content pages of a transaction flow for conducting different stages of a transaction via a graphical user interface (GUI) of an application executable at a user device, in accordance with one or more embodiments of the present disclosure.

FIG. 5 illustrates various content pages of a transaction flow 500 for conducting different stages of a transaction via a GUI of an application executable at a user device (e.g., application 212 at user device 210 of FIG. 2, as described above), in accordance with one or more embodiments of the present disclosure. For discussion purposes, transaction flow 500 will be described using system 200 of FIG. 2, as described above, but transaction flow 500 is not intended to be limited thereto. The user device in this example may be a mobile device and the application may be a payment application executable at the mobile device for an online payment service (e.g., payment service 222 of FIG. 2, as described above). In some implementations, at least a portion of transaction flow 500 may be hardcoded into the application or natively supported by the application. Additionally, a portion of transaction flow 500 may be dynamically generated or rendered by an SDK (e.g., SDK 216 of FIG. 2, as described above) in conjunction with one or more backend services provided via a network by a server (e.g., service provider server 220 of FIG. 2, as discussed above).

As shown in FIG. 5, transaction flow 500 includes a content page 510 and a content page 520. However, it should be understood that transaction flow 500 may include any number of additional pages, as desired for a particular implementation. Content page 510 may correspond to, for example, a dashboard or home page of the payment application that includes various options for a user to send funds to another user or request funds from another user. Content page 510 may also include an alert dialog 515, which may include a content display area for displaying content relating to an account of the user with the service provider.

In some embodiments, transaction flow 500 may be used to conduct different stages of a KYC transaction for ensuring compliance with one or more rules (e.g., tax rules) governing the payment service. Such rules may include, for example, tax laws or regulations that require the service provider to collect and verify legal consents, declarations, and identity details from users of the payment service. Based on these rules, the service provider may establish various conditions that users must satisfy to enable access to one or more features of the payment service.

Accordingly, the content displayed in the content display area of alert dialog 515 may include an alert message requiring the user to confirm or provide information pertaining to the user's taxpayer status as a condition to start or continue receiving payments or funds requested from other users via the payment service. Alert dialog 515 may be selectable by the user (e.g., via a touchscreen of the mobile device) for viewing additional content (e.g., a more detailed alert message). The additional content may be displayed to the user within content page 520. Content page 520 in this example may include a popup window 530 with a button 535 that the user may select to confirm the tax information as required to satisfy the condition for compliance with the tax rules and enabling the user to access the relevant features of the payment service for receiving payments. Selecting button 535 may cause another content page of transaction workflow 500 to be displayed within the GUI of the application for conducting the next stage of the KYC transaction, as shown in FIG. 6.

Figure 6:
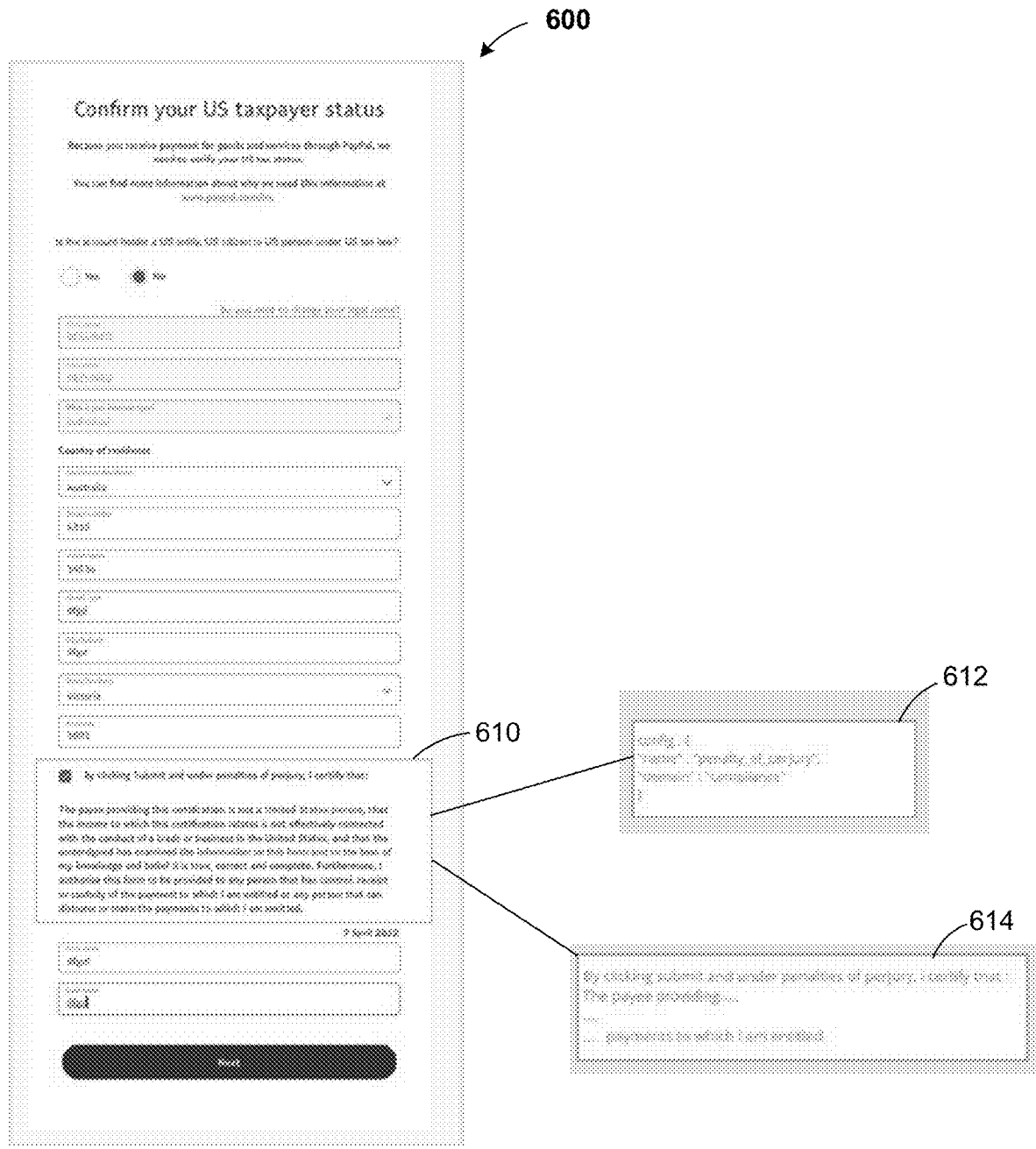
FIG. 6 illustrates a content page including a tagged user interface (UI) element displayed with dynamic content via a GUI of an application executable at a user device, in accordance with one or more embodiments of the present disclosure.

FIG. 6 illustrates an example of a content page 600 that may be displayed via the GUI of the application executable at the user device, as described above with respect to FIG. 5. Content page 600 may be displayed, for example, in response to the user selecting button 535 in popup window 530 of FIG. 5, as described above. As shown in FIG. 6, content page 600 includes a tagged UI element 610 for displaying dynamic content 614. In some embodiments, tagged UI element 610 may include content metadata identifying a source of dynamic content 614 and a baseline specification for the content display area of tagged UI element 610 on content page 600. The baseline specification may define, for example, boundaries for a length and a width of the content display area on content page 600.

FIG. 6 also shows a snippet of computer programming code (or source code) 612 corresponding to tagged UI element 610 along with a portion of dynamic content 614 displayed within a content display area associated with tagged UI element 610 on content page 600. Source code 612 may specify a name (e.g., "penalty of perjury") and a domain (e.g., "compliance") pertaining to the type of content to be displayed with tagged UI element 610 on content page 600. It should be appreciated that tagged UI element 610 may be one of various UI elements, such as various data input fields, displayed on content page 600. It should also be appreciated that source code 612 for content page 600 may include additional code, e.g., written in JavaScript Object Notation (JSON) or other relevant format, which defines the name, type, content, style, and/or layout locations of the various UI elements, including tagged UI element 610, on content page 600.

In some embodiments, dynamic content 614 may include legal content acquired from a legal authority or affiliated content source associated with the one or more rules governing the payment service, as described above. The legal authority may be, for example, a government agency (e.g., the Internal Revenue Service (IRS) of the United States federal government), and the one or more rules may be regulations prescribed by the government agency for the payment service and similar services provided by other online service providers. Based on such rules, the service provider in this example may determine a user requirement, e.g., a requirement for collecting a legal consent, declaration, or confirmation from each user, for compliance with the regulations.

In some embodiments, the service provider may use a smart contract to enforce such a user data collection requirement and ensure compliance with the rule(s) governing the payment service. The term "smart contract" generally refers to an agreement that is stored on a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VB Script, PHP, Perl, Python, Ruby, ASP, Tcl, etc. The script may be uploaded to the blockchain as a transaction on the blockchain.

Some blockchains, such as the Ethereum blockchain, feature smart contract functionality and include a decentralized replicated virtual machine that may execute smart contracts. In some implementations, smart contracts may be computer programs stored on a blockchain or blockchain network (e.g., blockchain network 145a of FIG. 1, as described above), which execute when predetermined conditions are met. Smart contracts may be used to implement different types of tokens on the blockchain for various purposes. Each token type may implement a respective token standard. For example, token standards on the Ethereum blockchain, introduced as Ethereum Requests for Comment (ERC), include, but are not limited to, the ERC-20 standard for fungible tokens, the ERC-721 standard for non-fungible tokens, and the ERC-1155 standard for both fungible and non-fungible tokens. Fungible tokens, such as virtual currencies, are interchangeable and essentially indistinguishable from one another. By contrast, a non-fungible token (NFT) represents a unique, non-interchangeable asset that is entirely digital or a tokenized version of a real-world asset. NFTs can be traded through an NFT marketplace that connects buyers and sellers.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information, or may even go out of business. Because blockchains are immutable, amending or updating a smart contract that resides in a blockchain may be challenging and thus, more expensive and/or more restrictive than with text-based contracts.

Figure 7:
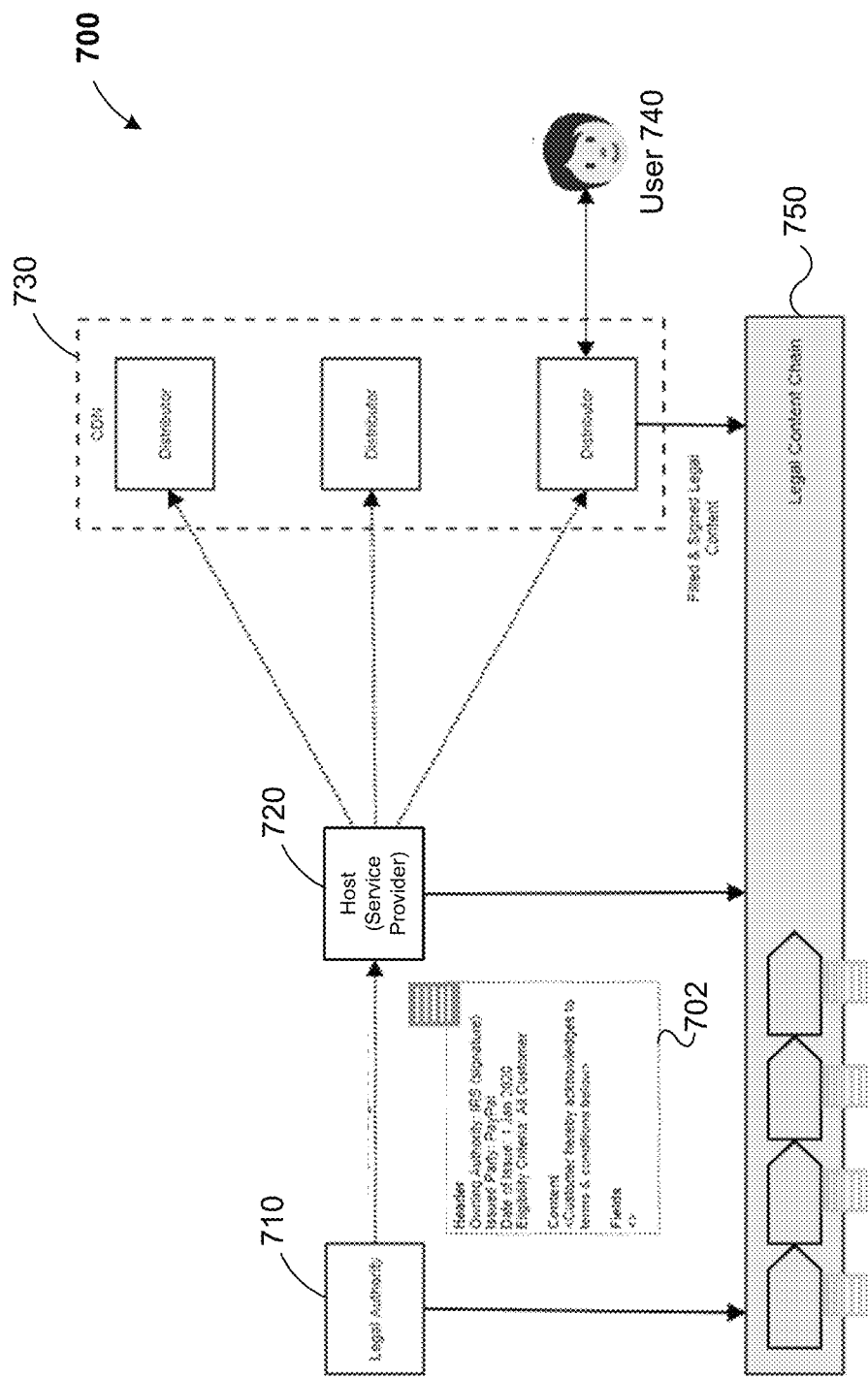
FIG. 7 is a block diagram of a system for legal content distribution and management using smart contracts, in accordance with one or more embodiments of the present disclosure.

FIG. 7 is a block diagram of a system 700 for legal content distribution and management using smart contracts, in accordance with one or more embodiments of the present disclosure. As shown in FIG. 7, system 700 includes a legal authority 710, a host (or service provider) 720 (e.g., server 120 of FIG. 1 or service provider server 220 of FIG. 2, as described above), a content distribution network (CDN) 730, a user 740 (e.g., user 215 or merchant associated with online marketplace 232 of FIG. 2, as described above), and a blockchain (or legal content chain) 750 (e.g., blockchain network 145a of FIG. 1, as described above). Legal authority 710 may be, for example, a government agency or affiliated entity that prescribes one or more rules governing an online service (e.g., payment service 222 of FIG. 2, as described above) associated with host 720, e.g., the service provider that provides the online service. In some embodiments, legal authority 710 may draft and provide legal content (e.g., a declaration or consent form) that host 720 may be required to display for users of the online service, including user 740, to comply with the one or more rules. Legal authority 710 in this example may also be referred to as the owner or issuer of the legal content. The legal content provided by legal authority 710 may be used by host 720 to define the terms or conditions of a smart contract.

In some embodiments, legal authority 710 may draft a legal template 702 including the relevant legal content and terms for the smart contract, which legal authority 710 shares with host 720. Host 720 may determine a user requirement (e.g., a user data collection requirement, as described above) for compliance with the terms (and one or more rules governing the online service) prescribed by legal authority 710. In some embodiments, the user requirement may be included in the terms obtained from legal authority 710. The user requirement in this case may include regulatory requirements prescribed by legal authority 710 for various online services, including the online service associated with host 720.

Host 720 may generate the smart contract based on the user requirement(s) or terms provided by legal authority 710. The smart contract may be digitally signed by host 720 and stored on blockchain 750 for execution by user 740 and other users of the online service. The smart contract may include conditions that user 740 must satisfy to enable access to one or more features of the online service. In some embodiments, host 720 may broadcast a transaction to nodes of a blockchain network (e.g., blockchain network 145c of FIG. 1, as described above) to store the smart contract on blockchain 750. User 740 may be any user of the online service, including any individual or entity, such as a merchant (e.g., the merchant associated with online marketplace 232 of FIG. 2, as described above), who can execute or digitally sign the smart contract. In some embodiments, host 720 may use one or more content distributors in CDN 730 to distribute the legal content (including an address of the smart contract on blockchain 750) to user 740 and other users of the online service. Each content distributor in CDN 730 may be, for example, a remote server designated by host 720 for legal content distribution.

In some embodiments, blockchain 750 may be used to store different versions of the smart contract that may be created over time. The smart contracts stored in blockchain 750 in this example may be linked together in a legal content chain, where each new version of the contract supersedes older versions. Such a legal content chain may be used to track the evolution of contract terms in a lineage of legal agreements between legal authority 710 and host 720 and between host 720 and user 740.

In some embodiments, host 720 may receive a request for user 740 to access the one or more features of the online service via a corresponding user device. Host 720 may then process the request based on whether user 740 has satisfied the conditions of the smart contract as stored on the blockchain network (or blockchain 750). For example, host 720 may authorize access to the requested feature(s) of the online service if host 720 determines that user 740 has satisfied the conditions of the smart contract. In some embodiments, the feature(s) of the online service in question may be selected by host 720 from among a plurality of features of the online service. Accordingly, the conditions included in the smart contract may be generated based on the features that are selected. For example, the conditions of the smart contract may require user 740 to provide compliance data (e.g., user identity details or taxpayer status information) to host 720. If user 740 has satisfied the conditions set forth in the smart contract, host 720 may authorize the request to enable access to the one or more features of the online service. The compliance data, including the information provided by user 740 to satisfy the conditions of the smart contract, may be stored in a database for later use, as will be described in further detail below.

In some embodiments, the conditions of the smart contract may include an issue date and an expiration date (or a predetermined time period) by which user 740 must satisfy the conditions to enable access to the one or more features of the online service. The smart contract may take effect and automatically execute on the issue date, e.g., to notify all relevant parties of the contract terms. In some cases, one or more of these dates may be set by legal authority 710 and included in the terms shared with host 720. The smart contract generated by host 720 in this example may include a date field that specifies the predetermined time period by which the user must satisfy the conditions to enable access to the one or more features of the online service. The smart contract may automatically execute at the end of the predetermined time period to notify the relevant parties (including host 720) that the relevant period for satisfying the conditions has lapsed. Host 720 may then choose to issue another smart contract with a new time period.

In some embodiments, the smart contract may also include a compliance status field, which host 720 may use to determine whether user 740 has satisfied the conditions of the smart contract. For example, the smart contract may automatically change the value of the compliance status field to indicate whether the user has satisfied the conditions by the end of the predetermined time period. In some embodiments, host 720 may detect an event on the blockchain network indicating a change in the value of the compliance status field of the smart contract. Host 720 may then query the smart contract stored on the blockchain network to retrieve the value of the compliance status field. If the value of the compliance status field indicates that user 740 has not satisfied the conditions by the predetermined time period, host 720 may generate a new smart contract including a time period by which user 740 must satisfy the conditions and enable access to the one or more features of the online service. Host 720 may broadcast a new transaction to the nodes of the blockchain network to store the new smart contract on blockchain 750 for execution by user 740. Host 720 may also transmit a notification of the new smart contract with the new time period to a device of user 740.

As described above, the online service provided by host 720 may be one of various online services governed by the one or more rules prescribed by legal authority 710. For example, the other online services may be provided by one or more other service providers that may be associated with host 720, e.g., one or more second service providers in a trust relationship with host 720 (the first service provider). Although the service providers may be associated with one another, each service provider traditionally operates independently to define the conditions of the smart contract and collect the compliance data that a user is required to provide to satisfy the conditions. This approach not only duplicates the efforts across related service providers, but it also negatively impacts the user's experience when the user is required to submit the same compliance data multiple times when attempting to use the respective online services of these service providers. Accordingly, embodiments of the present disclosure may be used to address these issues by providing a multi-tenant architecture for sharing the compliance data obtained by host 720 (or first service provider) for user 740 (and other users) with the one or more second service providers, as will be described in further detail below with respect to FIGS. 8-10.

Figure 8:
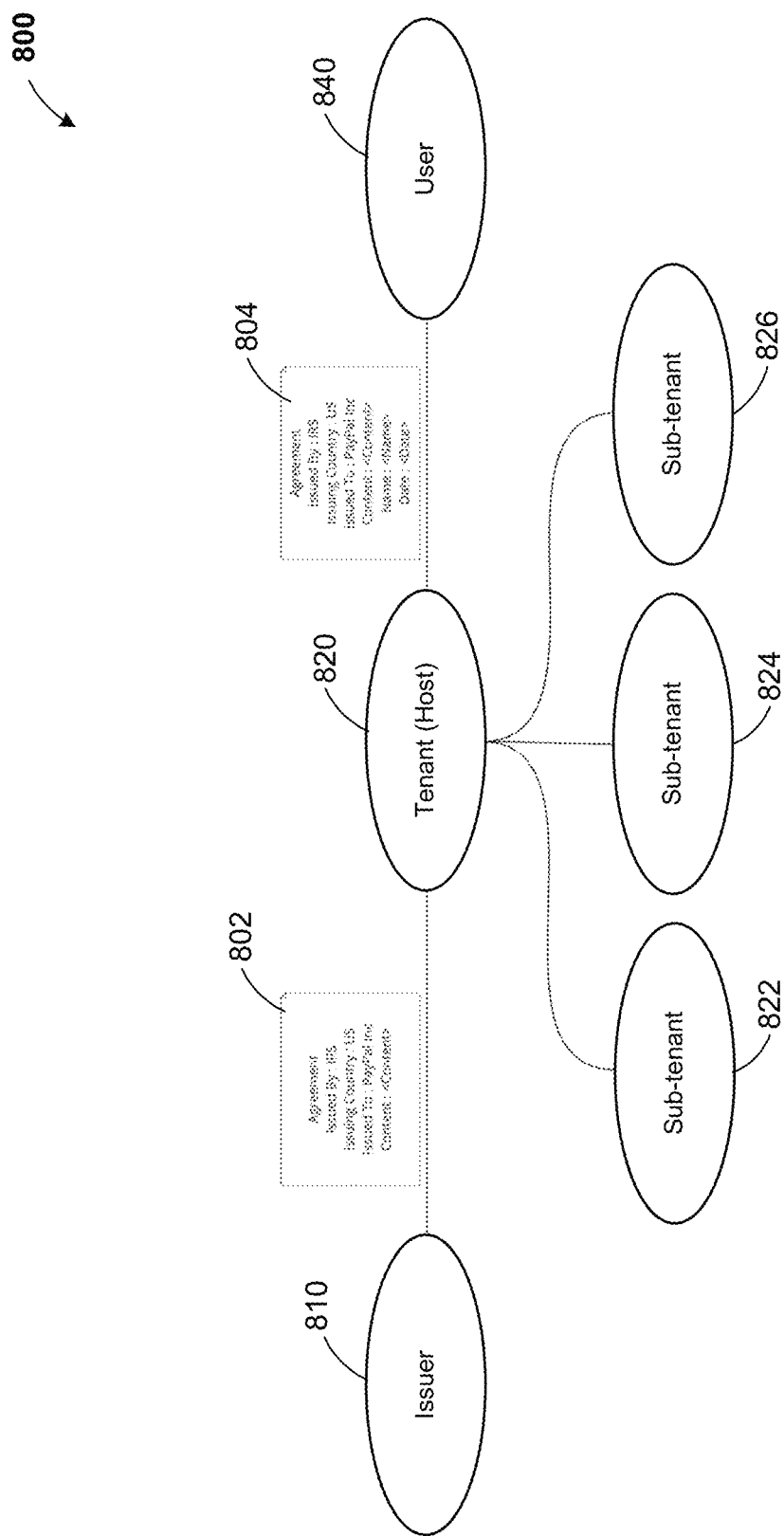
FIG. 8 is a diagram of a multi-tenant architecture for legal content distribution and management using smart contracts, in accordance with one or more embodiments of the present disclosure.

FIG. 8 is a diagram of a multi-tenant architecture 800 for legal content distribution and management using smart contracts, in accordance with one or more embodiments of the present disclosure. In some embodiments, the legal content distributed using multi-tenant architecture 800 may be provided by an issuer 810 (e.g., legal authority 710 of FIG. 7, as described above). Issuer 810 may provide, for example, a legal template 802 including the legal content and associated terms for a smart contract 804 generated by a host (or tenant) 820 (e.g., host 720 of FIG. 7, as described above) and stored on a blockchain (e.g., blockchain 750 of FIG. 7, as described above) for execution by a user 840 (e.g., a merchant associated with the online service).

Smart contract 804 may include conditions that user 840 must satisfy to access features of a first online service provided by host 820. For example, the conditions may require user 840 to provide compliance data, as described above. Host 820 in this example may be a tenant in multi-tenant architecture 800 that stores the compliance data provided by user 840 in a compliance database (not shown)

accessible to various sub-tenants 822, 824, and 826 in multi-tenant architecture 800. While only sub-tenants 822, 824, and 826 are shown in FIG. 8, it should be appreciated that multi-tenant architecture 800 may include any number of sub-tenants. Each sub-tenant in this example may be a service provider of a second online service that is associated with (e.g., in a trust relationship with) host 820 (the first online service provider). Accordingly, multi-tenant architecture 800 may be used to share the compliance data, as provided by user 840 to enable access to one or more features of the first online service of host (tenant) 820, with each sub-tenant in multi-tenant architecture 800 to further enable access to one or more corresponding features of the second online service.

In some embodiments, multi-tenant architecture 800 may be used in conjunction with a compliance platform to allow or deny a user's transactions (or transaction requests) that require access to the features of the respective online services. As will be described in further detail below with respect to FIG. 9, the decision to allow or deny a user's request for a transaction (and/or access to one or more features of an online service) may be based on whether the user has satisfied the conditions of a smart contract (e.g., smart contract 804 of FIG. 8, as described above).

Figure 9:
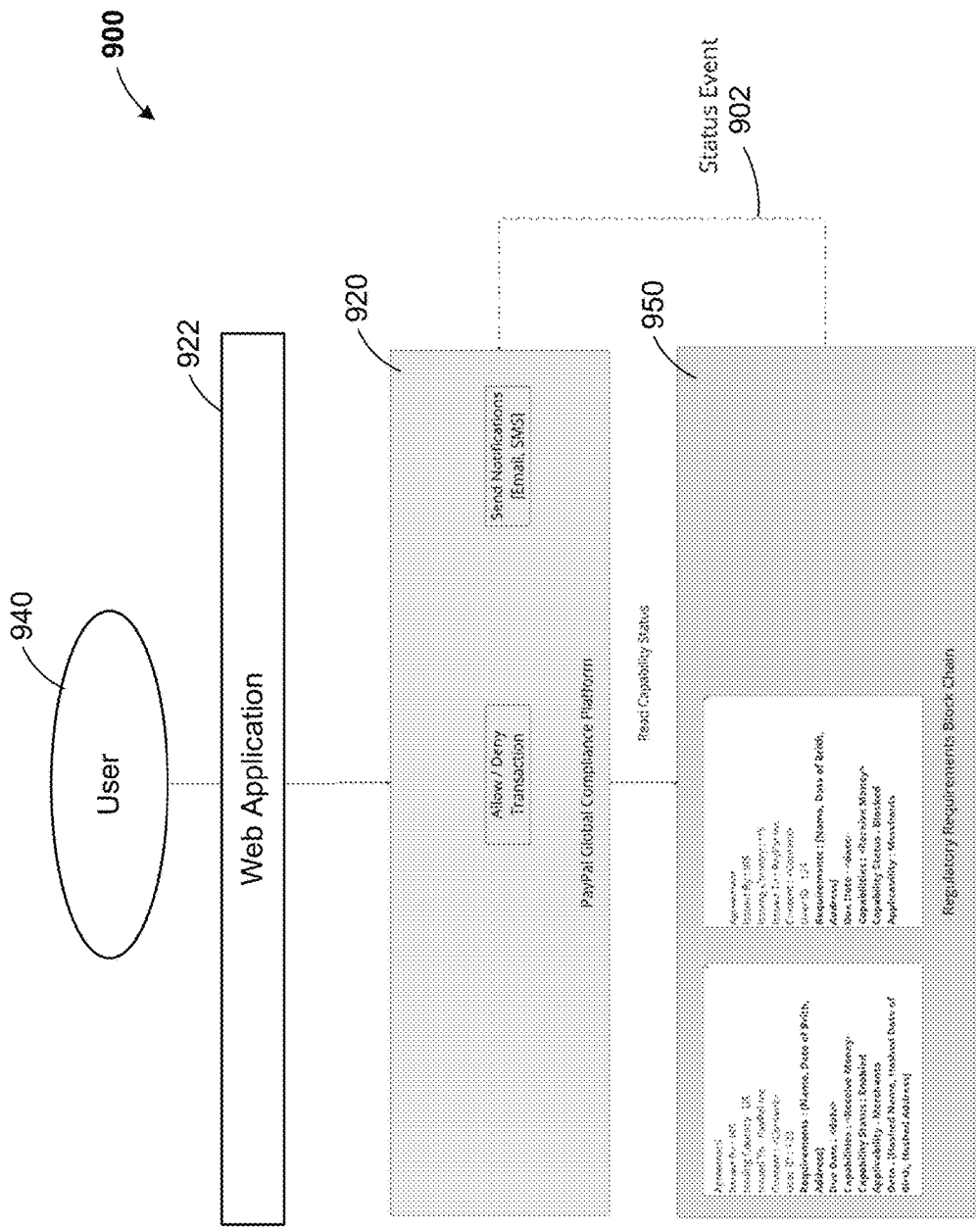
FIG. 9 is a block diagram of a system including a compliance platform for a tenant or sub-tenant in the multi-tenant architecture of FIG. 8 to enforce user requirements for compliance with one or more rules governing an online service through conditions of a smart contract that control access to capabilities or features of the online service, in accordance with one or more embodiments of the present disclosure.

FIG. 9 is a block diagram of a system 900 including a compliance platform 920 for controlling access to features of an online service provided by a tenant (e.g., host 820) or a sub-tenant (e.g., sub-tenant 822, 824, or 826) in multi-tenant architecture 800 of FIG. 8, as described above, using a smart contract stored on a blockchain 950. Compliance platform 900 may set conditions in the smart contract to enforce user requirements (e.g., data collection requirements) for compliance with one or more rules governing an online service (e.g., payment service 222 of FIG. 2, as described above). In some embodiments, the smart contract may include a compliance status field whose value may be used to determine whether a user 940 of the online service has satisfied the conditions of the smart contract, as described above, e.g., at the time of a request from user 940 for access to one or more features of the online service or by the end of a predetermined time period set by the tenant or an issuer (e.g., issuer 810 of FIG. 8 or legal authority 710 of FIG. 7, as described above) of legal content and terms used to define the conditions of the smart contract.

In some embodiments, the smart contract may automatically execute on a due date corresponding to the end of the predetermined time period, e.g., as specified by a date field included in the smart contract. For example, the smart contract may automatically change the value of the compliance status field to indicate whether user 940 has satisfied the conditions by the due date specified by the date field. The value of the compliance status field may be used to decide whether to allow or deny user 940's request for access to the feature(s) of the online service and whether to enable or disable the feature(s) or associated capabilities for the user accordingly.

Figure 10:
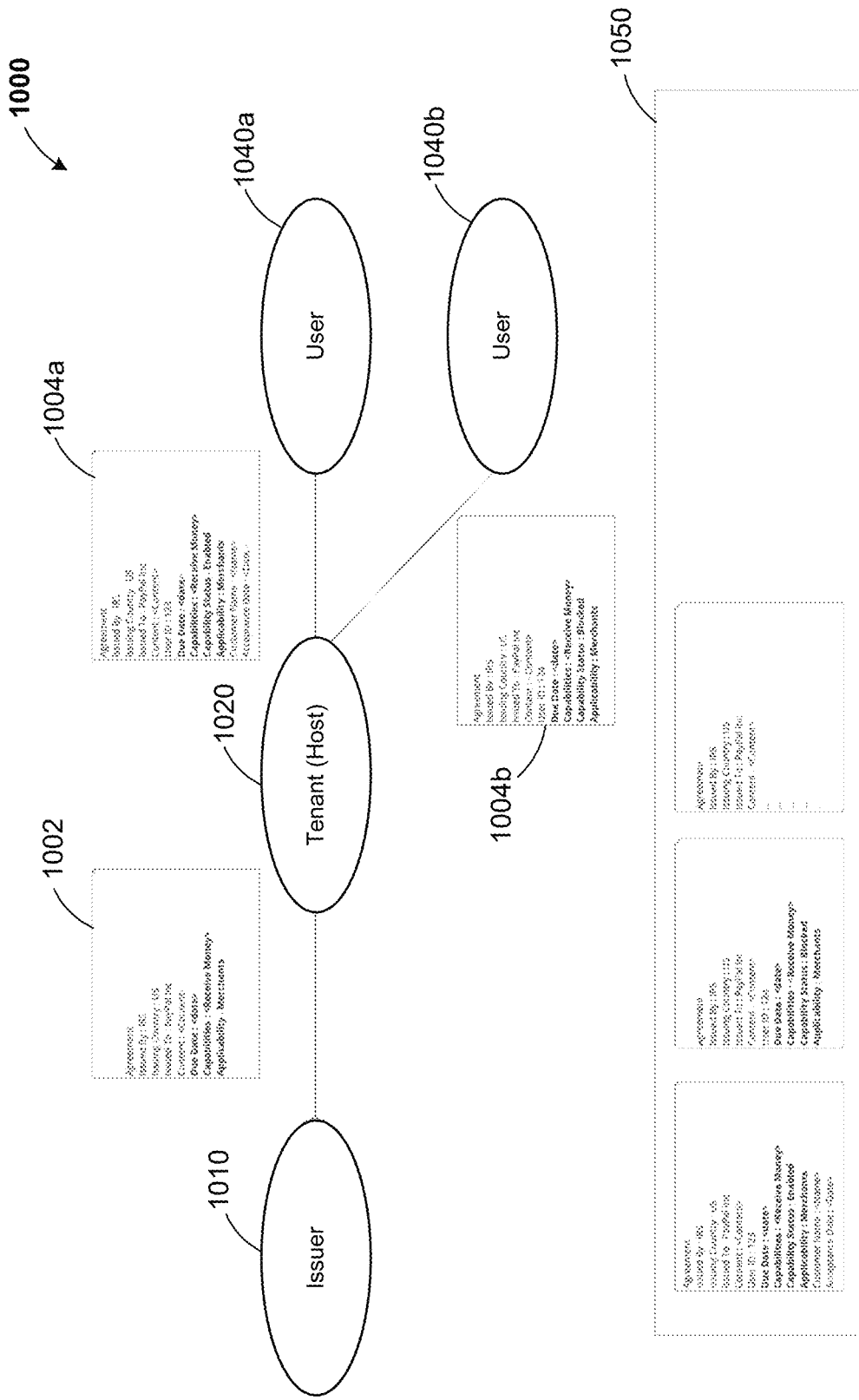
FIG. 10 illustrates an example of regulatory compliance enforcement using the compliance platform of FIG. 9, in accordance with one or more embodiments of the present disclosure.

For example, as shown in FIG. 10, a tenant (or host) 1020 in a multi-tenant architecture 1000 may use the value of a compliance status field in different versions of a smart contract (1004a and 1004b) stored on a blockchain 1050 for respective users (e.g., merchants) 1040a and 1040b to decide whether to enable or disable a requested capability of an online service (e.g., payment service 222 of FIG. 2, as described above) provided by host/tenant 1020 for each user (e.g., by authorizing or denying a request from that user to access a corresponding feature of the online service). Smart contracts 1004a and 1004b may be generated by host 1020 for the respective users based on a legal template 1002 provided by an issuer 1010. The value of the compliance status field in smart contract 1004a indicates, for example, that user 1040a is compliant and has satisfied the conditions by the due date to enable a capability for receiving money through electronic payments or fund transfers processed by the online service. Conversely, the value of a compliance status field in smart contract 1004b indicates that user 1040b in this example is not compliant and that the same capability of the online service for receiving money or payments may be disabled for user 1040b.

Referring back to FIG. 9, blockchain 950 may publish a status event 902 indicating a change in the value of the compliance status field of the smart contract. In some embodiments, compliance platform 920 may detect event 902 and notify the tenant/host. The tenant/host may use compliance platform 920 to query the smart contract stored on blockchain 950 to retrieve the value of the compliance status field. Compliance platform 920 may also be used to send out notifications of the status change to user 940 via a communication channel (e.g., via email, short messaging service (SMS), etc.) associated with a web application 922 that allows user 940 to access features of the online service through a web browser or other native application executable at a device of user 940. The tenant/host in this example can also use the value of the compliance status field to determine whether to enable or disable a capability that requires access to the features of the online service, as described above. In some embodiments, the capability and corresponding features of the online service may be selected by the tenant/host (or service provider) from among a list of capabilities and corresponding list of features of the online service.

Figure 11:
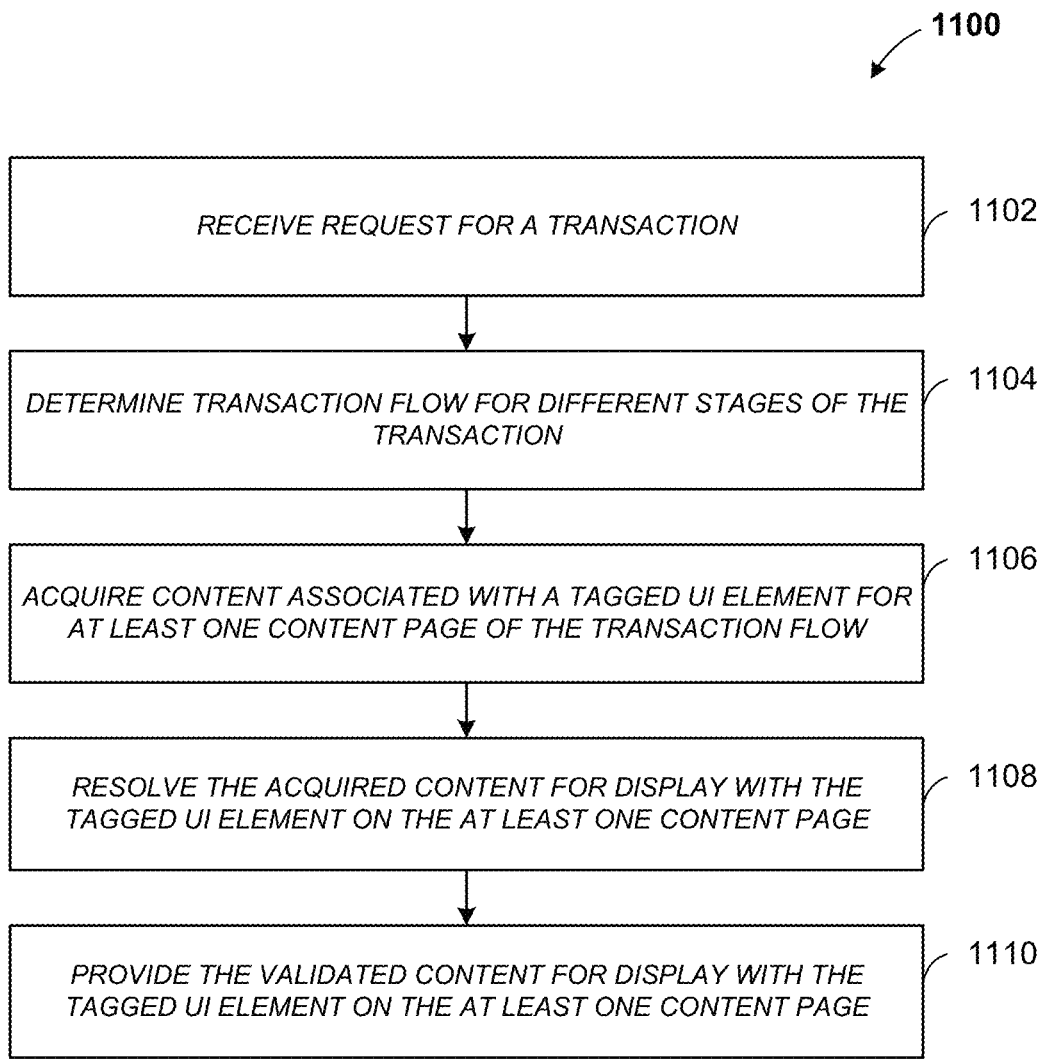
FIG. 11 is a flow diagram of a process for content distribution and management, in accordance with one or more embodiments of the present disclosure.

FIG. 11 is a flow diagram of a process 1100 for content distribution and management, in accordance with one or more embodiments of the present disclosure. Process 1100 may be performed by, for example, content manager 226 of FIG. 3 or content management service 336 of FIG. 3, as described above. As shown in FIG. 11, process 1100 may begin in step 1102, which includes receiving, via a network from an application executable at a user device (e.g., user device 210 of FIG. 2, as described above), a request for a transaction.

Process 1100 then proceeds to step 1104, which includes determining a transaction flow for conducting different stages of the transaction via a GUI of the application at the user device. The transaction flow may include a sequence of content pages corresponding to the different stages of the transaction.

In step 1106, content associated with a tagged user interface (UI) element for at least one content page of the transaction flow may be acquired from a content source (e.g., content server(s) 250 of FIG. 2, as described above). The tagged UI element may include content metadata identifying the content source and a baseline specification for a content display area of the tagged UI element on the at least one content page.

In step 1108, the acquired content may be resolved for display with the tagged UI element on the content page via the GUI of the application at the user device. In step 1110, the validated content may then be provided, via the network to the application at the user device, to be displayable within the content display area of the tagged UI element on the content page of the transaction flow during a corresponding stage of the transaction.

In some embodiments, the content associated with the tagged UI element may be dynamic content acquired from the source in response to the request received from the application at the user device. The dynamic content may be resolved in step 1108 using, for example, an AI engine (e.g., AI engine 229 of FIG. 2 or AI engine 329 of FIG. 3, as described above) with visual regression. Such a visual AI engine may also be used to perform content fit validation for the dynamic content acquired from the content source before it is provided to the user's device, as will be described in further detail below with respect to FIG. 12.

Figure 12:
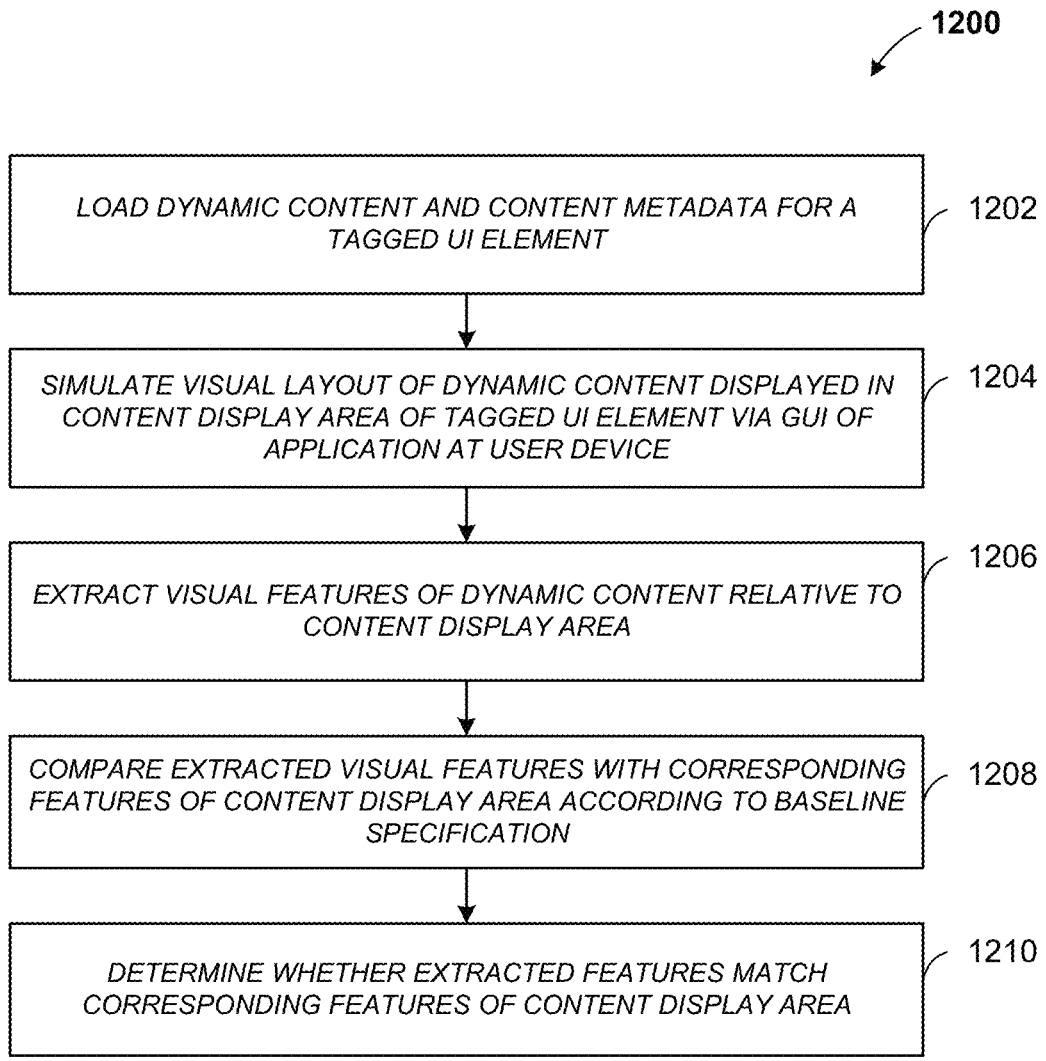
FIG. 12 is a flow diagram of a process for validating dynamic content for different device configurations using visual regression, in accordance with one or more embodiments of the present disclosure.

FIG. 12 is a flow diagram of a process 1200 for validating dynamic content for different device configurations using visual regression, in accordance with one or more embodiments of the present disclosure. As described above, the dynamic content may include any content that may be acquired by a service provider in real time or on demand from a content source (or author) and that may be changed or updated by the content source at any time, e.g., on a frequent or periodic basis. This includes content, such as product disclosures, declarations, and consents, which may be presented to users as part of a KYC transaction flow, e.g., during an on-boarding or product provisioning process for new users of a service provider. In some embodiments, an AI engine (e.g., AI engine 229 of FIG. 2 or AI engine 329 of FIG. 3, as described above) with visual regression may be used to ensure that such content is displayed correctly and consistently across different content channels (e.g., web vs. native), different software applications (e.g., different types of web browsers and operating systems), and different types of user devices (e.g., mobile vs. desktop).

As shown in FIG. 12, process 1200 begins in step 1202, which includes loading the dynamic content acquired from the source and associated content metadata for the tagged UI element. Process 1200 then proceeds to step 1204, which includes simulating a visual layout of the tagged UI element with the dynamic content acquired from the source and displayed on the at least one content page via the GUI of the application at the user device.

In step 1206, visual features of the dynamic content relative to the content display area of the tagged UI element may be extracted from the simulated visual layout.

In step 1208, the extracted visual features are compared with corresponding features of the content display area according to the baseline specification included in the content metadata, as described above.

In step 1210, a determination is made as to whether the extracted visual features from the simulated visual layout match the corresponding features of the content display area from the baseline specification, based on the comparison in step 1208.

As described above with respect to FIGS. 7-10, the content provided to the user device may be legal content acquired from a legal authority. As will be described in further detail below, the transaction flow associated with such legal content may be for a blockchain based transaction involving a smart contract stored on the blockchain.

Figure 13:
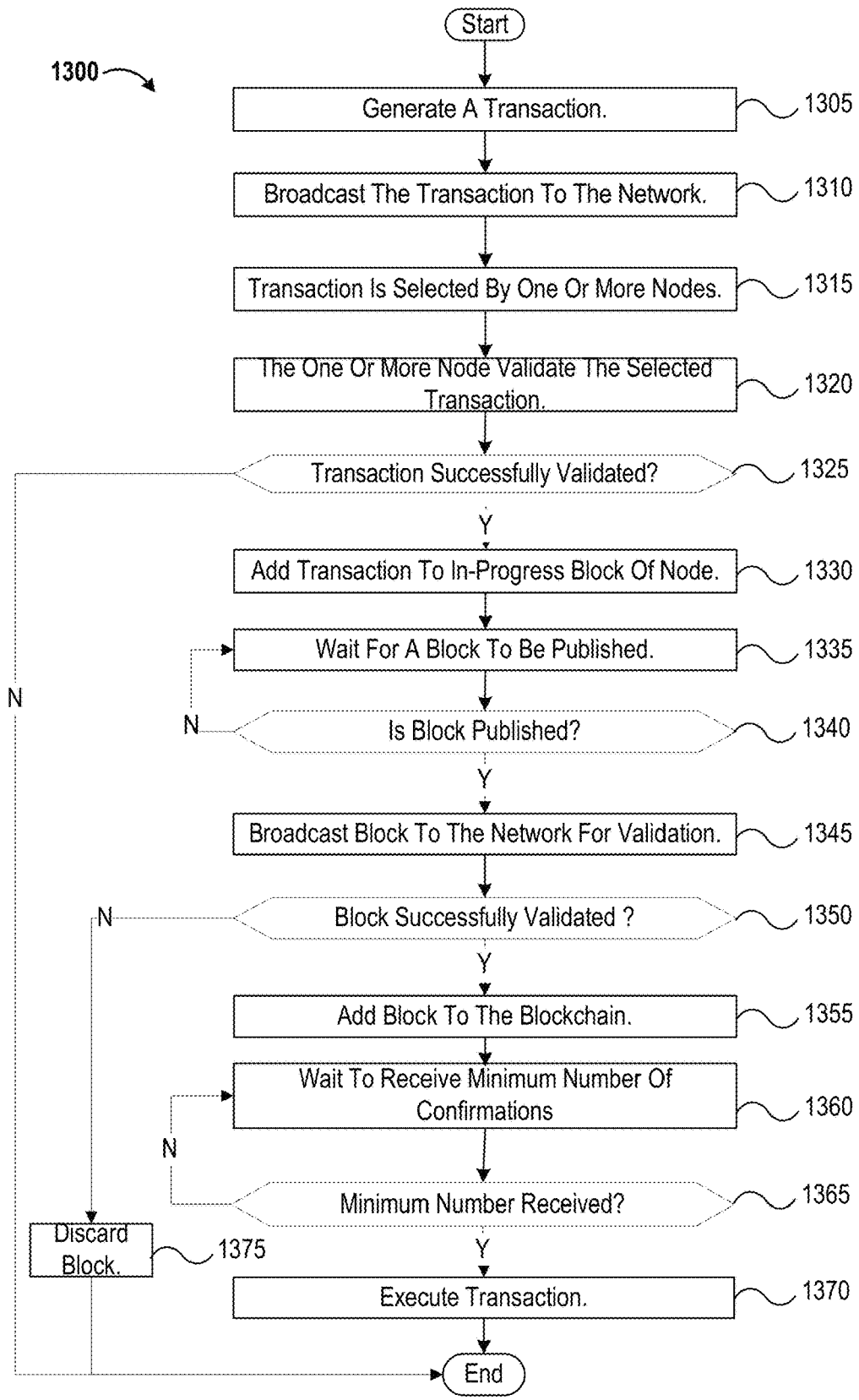
FIG. 13 is a flow diagram of a process for performing a blockchain based transaction, in accordance with one or more embodiments of the present disclosure.

FIG. 13 is a flow diagram of a process 1300 for performing a blockchain based transaction, in accordance with one or more embodiments of the present disclosure. The blockchain based transaction may involve, for example, the creation or transfer of cryptocurrency between different entities or users. Additionally, or alternatively, the blockchain based transaction may involve the creation or exchange of a smart contract between the entities or users, as described above and as will be described in further detail below. Process 1300 may be performed by, for example, content manager 226 of FIG. 3 or content management service 336 of FIG. 3, as described above.

Cryptocurrency generally refers to a medium of exchange that may be created and stored electronically on a blockchain network, such as blockchain network 145a of FIG. 1, as described above. Bitcoin is only one example of the various cryptocurrencies in circulation. Various encryption techniques may be used for creating the units of cryptocurrency and verifying cryptocurrency transactions. For example, user 115a in FIG. 1 may own 10 units of a cryptocurrency. Blockchain network 145a may include a transaction record identifying user 115a as the owner of the 10 units of cryptocurrency. User 115a in this example may initiate a transfer of the 10 units of cryptocurrency from a digital wallet of user 115a to a digital wallet of user 115b. Each user's digital wallet may be implemented as, for example, a wallet application executable at that user's device, e.g., client device 110a of user 115a and client device 110b of user 115b. Each user's digital wallet or wallet application may be secured with a private key that is required to access the wallet's contents.

As will be described in further detail below, the blockchain transaction for the transfer of cryptocurrency between the respective wallets of users 115a and 115b in this example may be performed using process 1300 of FIG. 13. For discussion purposes, process 1300 will be described using system 100 of FIG. 1, as described above, but process 1300 is not intended to be limited thereto. Process 1300 may be performed by, for example, any one or any combination of the computing devices shown in FIG. 1. It should be appreciated that the steps or operations of process 1300 may be modified, omitted, or performed in a different order and/or that other steps may be added, as desired for a particular implementation. In some implementations, for example, process 1300 may be appropriately adapted for other types of blockchain based transactions, such as transactions involving a smart contract, as described above and as will be described in further detail below with respect to FIG. 14.

As shown in FIG. 13, process 1300 begins at step 1305, which includes generating a transaction, e.g., the transaction for transferring the 10 units of cryptocurrency from user 115a to user 115b, as described above. The wallet application at client device 110a of user 115a may generate transaction data and a public key for the transaction using a private key of user 115a. To indicate that user 115a is the originator of the transaction, a digital signature may also be generated for the transaction using the private key of user 115a. In some embodiments, the digital signature may be generated by applying a hash function to the transaction data and encrypting the hashed transaction data and the original transaction data using the private key of user 115a. In some embodiments, the transaction data may include the digital signature and other information, such as a blockchain address of the sender (e.g., user 115a) or wallet thereof, transaction output information, and the public key of the sender. The transaction output information may include information about the asset (cryptocurrency) being transferred and a blockchain address of the recipient (e.g., user 115b) or wallet thereof. The transaction data may be sent from client device 110a to, for example, a server of a service provider (e.g., server 120 of FIG. 1 or service provider server 220 of FIG. 2, as described above).

At step 1310, the service provider server may broadcast the transaction to blockchain network 145a after receiving the transaction data from client device 110a. The transaction may be received by one or more nodes of blockchain network 145a. At step 1315, upon receiving the transaction, the node(s) may choose to validate the transaction depending on, for example, transaction fees associated with the transaction. If the transaction is not selected for validation by any of the nodes in the network, then the transaction may be placed in a queue until it is selected by at least one node.

At step 1320, each node that selected the transaction may validate the transaction. Validating the transaction may include determining whether the transaction is legal or conforms to a pre-defined set of rules for that transaction, establishing user authenticity, and establishing transaction data integrity. At step 1325, a determination is made as to whether the transaction has been successfully validated. If the transaction is successfully validated by at least node, the validated transaction is added to a block being constructed by that node at step 1330. As different nodes may choose to validate different transactions, each of the different nodes may build or assemble a block for a different transaction that node chooses to validate. Thus, the transaction associated with user 115*a* transfer of cryptocurrency to user 115*b* may be included in some blocks and not others.

At step 1335, blockchain network 145*a* may wait for a block to be published. In some cases, validated transactions may not be added to the block being assembled by a node until the block reaches a minimum size specified by the blockchain. If blockchain network 145*a* utilizes a proof of work consensus model, then different nodes may compete for the right to add their respective blocks to the blockchain by solving a complex mathematical puzzle. The node that solves the puzzle first wins the right to publish its block. As compensation, the winning node may be awarded a transaction fee associated with the transaction (e.g., from the wallet of user 115*a*). The transaction fee or award may be, for example, an amount of cryptocurrency added to an account associated with the winning node from blockchain network 145*a* (e.g., "new" units of cryptocurrency entering circulation). This method of compensation and releasing new units of cryptocurrency into circulation is sometimes referred to as "mining."

At step 1340, if a block still has not been published (e.g., after a predetermined time), then process 1300 returns to step 1335 and continues to wait for a block to be published. If a block has been published, then process 1300 proceeds to step 1345, in which the published block is broadcast to blockchain network 145*a* for validation.

At step 1350, if the block is validated by a majority of the nodes in blockchain network 145*a*, then the validated block is added to the blockchain at step 1355. However, if the block is not validated by a majority of the nodes, then process 1300 proceeds to step 1375. At step 1375, the block is discarded and the transactions in the discarded block are returned back to the queue. The transactions in the queue may be selected by one or more nodes for the next block. The node that built the discarded block may build a new next block.

At step 1360, if the transaction was added to the blockchain, the service provider server may wait to receive a minimum number of blockchain confirmations for the transaction. At step 1365, if the minimum number of confirmations for the transaction have not been received, then process 1300 may return to step 1360. However, if the minimum number of confirmations have been received, then process 1300 proceeds to step 1370. At step 1370, the transaction may be executed and the appropriate assets (e.g., the 10 units of cryptocurrency) may be transferred from the digital wallet of user 115*a* to that of user 115*b*.

In addition to cryptocurrency transactions, embodiments of the present disclosure may be applied to other types of blockchain based transactions, e.g., transactions involving smart contracts, as described above. Accordingly, the blockchain may serve as a decentralized or distributed ledger to record transaction data associated with various cryptocurrencies, smart contracts, and other types of transaction data. Copies and/or parts of a blockchain can be stored across different computer nodes, where each computer node may be configured to validate transactions and add new transaction data to the blockchain. As a new transaction is conducted, one or more of the computer nodes may be configured to validate the new transaction (e.g., through a proof-of-work or a proof-of-stake mechanism, etc.). Once the new transaction is validated, the transaction data of the new transaction may be packaged into a block and appended to the copies of the blockchain by the one or more of the computer nodes.

Figure 14:
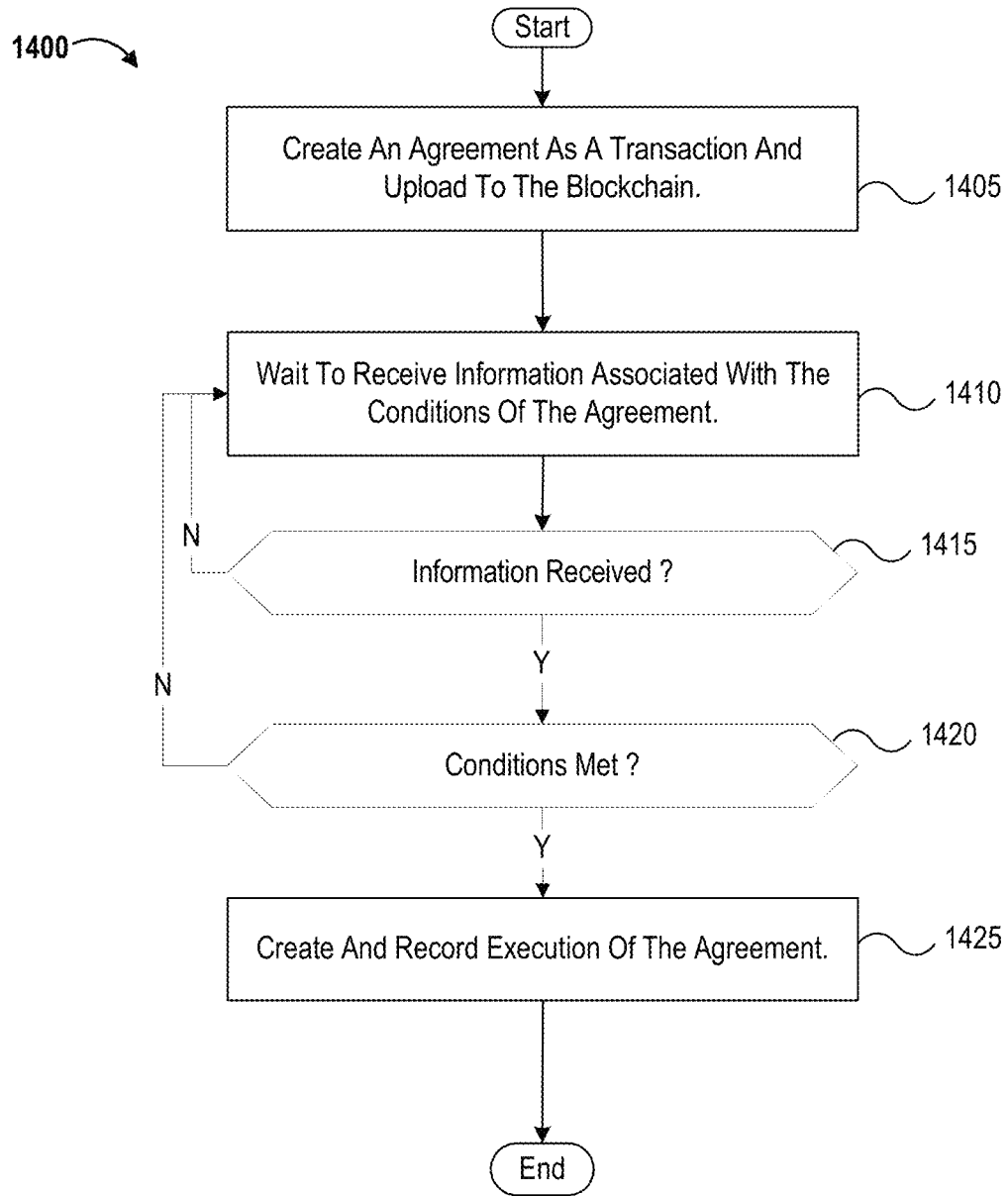
FIG. 14 is a flow diagram of a process for performing a blockchain based transaction involving a smart contract.

FIG. 14 is a flow diagram of a process 1400 for performing a blockchain based transaction involving a smart contract between entities. For example, a smart contract may be used to enforce the terms of a lease agreement between a tenant and a landlord for an apartment unit rented by the tenant. A smart contract may be utilized between the tenant and the landlord for payment of the rent. The smart contract may indicate that the tenant agrees to pay next month's rent of $1000 by the 28th day of the current month. The agreement may also indicate that if the tenant pays the rent, then the landlord provides the tenant with an electronic receipt and a digital entry key to the apartment. The agreement may also indicate that if the tenant pays the rent by the 28th day of the current month, then both the entry key and the rent are released on the last day of the current month to the tenant and the landlord, respectively.

The steps of the process 1400 may be performed by, for example, content manager 226 of FIG. 3 or content management service 336 of FIG. 3, as described above. It should be appreciated, however, that one or more of these steps may be modified, omitted, and/or performed in other orders, and/or other steps added.

At step 1405, the agreement or smart contract between the tenant and the landlord in this example may be created and then submitted to a blockchain network (e.g., blockchain network 145*a* of FIG. 1, as described above) as a transaction. The transaction may be added to a block that is mined by the nodes of the blockchain network. The block comprising the transaction may also be validated by the blockchain network and then recorded in the blockchain (e.g., using process 1300 of FIG. 13, as described above). The agreement associated with the transaction may be given a unique address for identification.

At step 1410, the process 1400 waits to receive information regarding the conditions relevant for the agreement. For example, the process 1400 may wait to receive notification that $1000 was sent from a blockchain address associated with the tenant and was received at a blockchain address associated with the landlord by the 28th of the current month. At step 1415, if such a notification is not received, then the process 1400 returns to step 1410. However, if at step 1415, a notification is received, then the process 1400 proceeds to step 1420.

At step 1420, based on determining that the received notification satisfies the conditions needed to trigger execution of the various terms of the smart contract, the process 1400 proceeds to step 1425. However, at step 1420, if it is determined that the received notification does not satisfy the conditions needed to trigger execution of the smart contract, then the process 1400 returns to step 1410. At step 1425, a transaction associated with execution of the smart contract is created. For example, the transaction may include information of the payment received, the date the payment was received, an identification of the tenant and an identification of the landlord. The transaction may be broadcast to the blockchain network and recorded in the blockchain, as described above. If the transaction is successfully recorded in the blockchain, the transaction may be executed. For example, if the payment was received on the 28th, then an electronic receipt may be generated and sent to the tenant. However, on the last day of the current month, both the digital entry key and the rent are released respectively to the tenant and the landlord.

Figure 15:
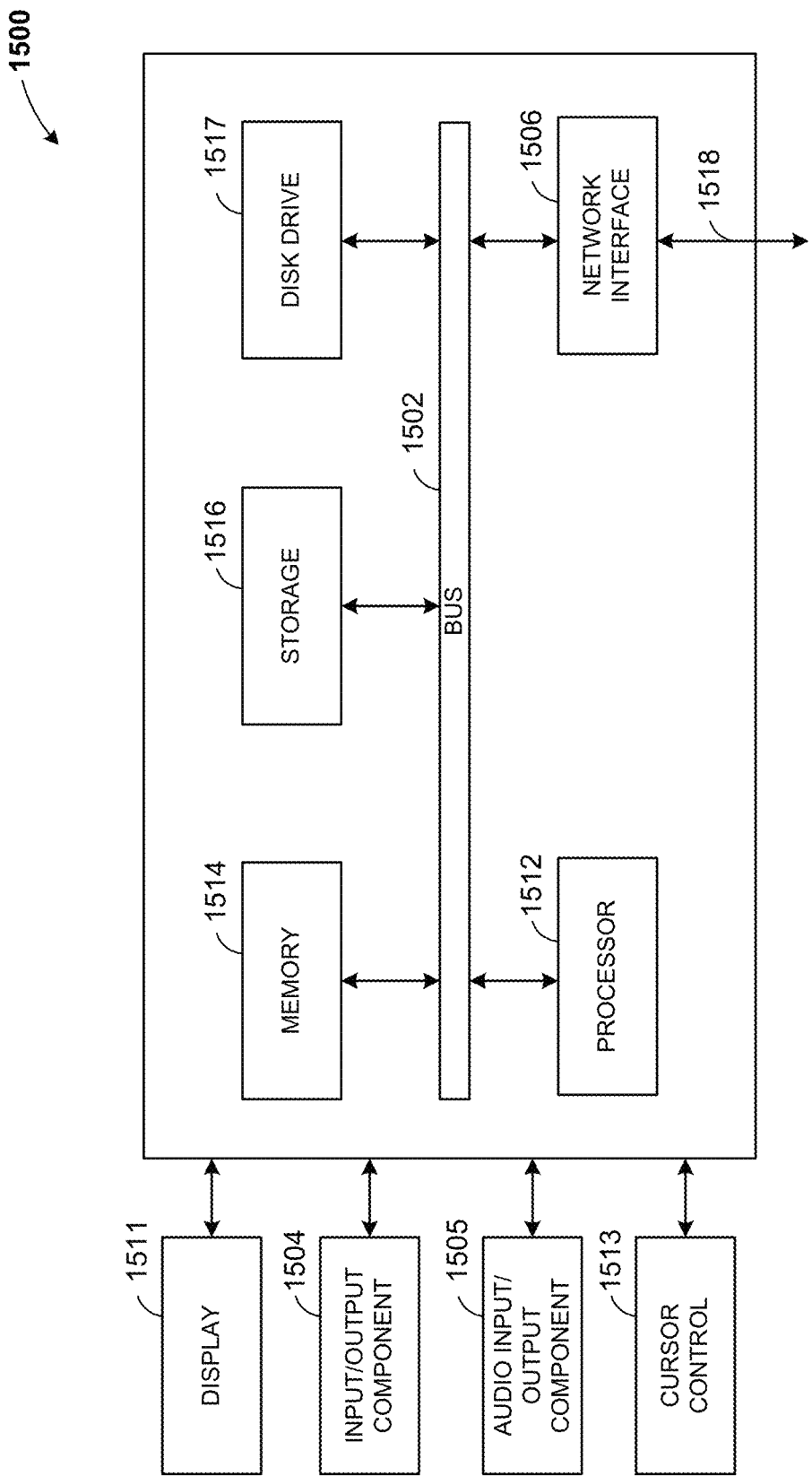
FIG. 15 is a block diagram of a computer system in which embodiments of the present disclosure may be implemented.

FIG. 15 is a block diagram of a computer system 1500 in which embodiments of the present disclosure may be implemented. Computer system 1500 may be suitable for implementing, for example, one or more components of the devices and servers in systems 100 and 200 of FIGS. 1 and 2, respectively, according to various implementations of the present disclosure. Computer system 1500 may also be suitable for implementing application framework 300 of FIG. 3 as well as processes 400, 1100, 1200, 1300, and 1400 of FIGS. 4, 11, 12, 13, and 14, respectively, as described above. In various implementations, a client or user device may comprise a personal computing device e.g., smart phone, a computing tablet, a personal computer, laptop, a wearable computing device such as glasses or a watch, Bluetooth device, key FOB, badge, etc.) capable of communicating with a service provider over a network, e.g., network 140 or 240 of FIG. 1 or FIG. 2, respectively. The service provider may utilize a network computing device (e.g., a network server) capable of communicating with the network. It should be appreciated that each of the devices utilized by users and service providers may be implemented as computer system 1500 in a manner as follows.

Computer system 1500 includes a bus 1502 or other communication mechanism for communicating information data, signals, and information between various components of computer system 1500. Components include an input/output (I/O) component 1504 that processes a user action, such as selecting keys from a keypad/keyboard, selecting one or more buttons, image, or links, and/or moving one or more images, etc., and sends a corresponding signal to bus 1502. I/O component 1504 may also include an output component, such as a display 1511 and a cursor control 1513 (such as a keyboard, keypad, mouse, etc.). An optional audio input/output component 1505 may also be included to allow a user to use voice for inputting information by converting audio signals. Audio I/O component 1505 may allow the user to hear audio. A transceiver or network interface 1506 transmits and receives signals between computer system 1500 and other devices, such as another communication device, service device, or a server (e.g., service provider server 220 of FIG. 2, as described above) via a network (e.g., network 240 of FIG. 2, as described above). In some implementations, the signal transmission may be wireless, although other transmission mediums and methods may also be suitable. One or more processors 1512, which can be a micro-controller, digital signal processor (DSP), or other processing component, processes these various signals, such as for display on computer system 1500 or transmission to other devices via a communication link 1518. Processor(s) 1512 may also control transmission of information, such as cookies or IP addresses, to other devices.

Components of computer system 1500 also include a system memory component 1514 (e.g., RAM), a static storage component 1516 (e.g., ROM), and/or a disk drive 1517. Computer system 1500 performs specific operations by processor(s) 1512 and other components by executing one or more sequences of instructions contained in system memory component 1514. Logic may be encoded in a computer readable medium, which may refer to any medium that participates in providing instructions to processor(s) 1512 for execution. Such a medium may take many forms, including but not limited to, non-volatile media, volatile media, and transmission media. In various implementations, non-volatile media includes optical or magnetic disks, volatile media includes dynamic memory, such as system memory component 1514, and transmission media includes coaxial cables, copper wire, and fiber optics, including wires that comprise bus 1502. In one implementation, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 1500. In various other implementations of the present disclosure, a plurality of computer systems 1500 coupled by communication link 1518 to the network (e.g., such as a LAN, WLAN, PTSN, and/or various other wired or wireless networks, including telecommunications, mobile, and cellular phone networks) may perform instruction sequences to practice the present disclosure in coordination with one another.

Although the various components of computer system 1500 are described separately, it should be appreciated that the functionality of the various components may be combined and/or performed by a single component and/or multiple computing devices in communication with one another, as desired for a particular implementation.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   one or more hardware processors; and
   a non-transitory memory having stored therein instructions that are executable by the one or more hardware processors to cause the system to perform operations comprising:
   receiving, via a network from an application executable at a user device, a request for a transaction;
   responsive to the received request, determining a transaction flow for conducting different stages of the transaction via a graphical user interface (GUI) of the application at the user device, the transaction flow including a sequence of content pages corresponding to the different stages of the transaction;
   acquiring content associated with a tagged user interface (UI) element for at least one content page of the transaction flow, the tagged UI element including content metadata, the content metadata identifying a source of the content and a baseline specification for a content display area of the tagged UI element on the at least one content page, and wherein at least a portion of the content is dynamic content;
   simulating a visual layout of the tagged UI element with the dynamic content acquired from the source and displayed on the at least one content page via the GUI of the application at the user device;
   validating the acquired content based on visual features in the simulated visual layout and corresponding features in the baseline specification; and
   providing, via the network to the application at the user device, the validated content to be displayable within the content display area of the tagged UI element on the at least one content page of the transaction flow during a corresponding stage of the transaction.

2. The system of claim 1, wherein the dynamic content is acquired from the source in response to the request received from the application at the user device, and wherein the validating the acquired content comprises:
   extracting the visual features of the dynamic content relative to the content display area of the tagged UI element from the simulated visual layout;
   comparing the extracted visual features with the corresponding features of the content display area according to the baseline specification; and
   determining whether the extracted visual features from the simulated visual layout match the corresponding features of the content display area from the baseline specification, based on the comparing.

3. The system of claim 2,
   wherein simulating the visual layout further comprises generating a snapshot image of the at least one content page including the tagged UI element with the dynamic content,
   wherein extracting the visual features comprises extracting a visible portion of the dynamic content from the snapshot image and dimensions of the visible portion relative to the content display area of the tagged UI element, and
   wherein comparing the extracted visual features comprises:
      comparing the visible portion of the dynamic content extracted from the snapshot image with the dynamic content acquired from the source; and
      comparing the dimensions of the visible portion of the dynamic content from the snapshot image with boundaries of the content display area according to the baseline specification.

4. The system of claim 3, wherein the dynamic content is validated for the tagged UI element when:
   the visible portion of the dynamic content extracted from the snapshot image matches the dynamic content acquired from the source; and
   the dimensions of the visible portion fall within the boundaries of the content display area.

5. The system of claim 2, wherein validating the dynamic content further comprises:
   calculating a content fit score for the dynamic content acquired from the source, based on the comparing, the content fit score representing a degree of similarity between the extracted visual features of the dynamic content and the corresponding features of the content display area according to the baseline specification; and
   validating the dynamic content when the calculated content fit score meets a predetermined threshold.

6. The system of claim 5, wherein the operations further comprise:
   transmitting a content validation failure notification to the source of the dynamic content when the calculated content fit score fails to meet the predetermined threshold.

7. The system of claim 1, wherein the request includes device metadata identifying a software configuration or a hardware configuration of the user device, and the baseline specification for the content display area of the tagged UI element is customized for the software configuration or the hardware configuration of the user device.

8. The system of claim 7, wherein the content acquired from the source includes different content variants for a plurality of device configurations, and the operations further comprise:
   selecting at least one of the content variants for a device configuration corresponding to the software configuration or the hardware configuration of the user device identified by the device metadata.

9. The system of claim 8, wherein:
   the content variants are acquired from the source via an application programming interface (API) of a content management service;
   the content management service includes an artificial intelligence (AI) engine that classifies each of the acquired content variants for the plurality of device configurations; and
   each content variant is stored in a database of the content management service with a customized version of the baseline specification corresponding to at least one device configuration recommended by the AI engine for that content variant based on the classification.

10. A method comprising:
determining a transaction flow for conducting different stages of a transaction via a graphical user interface (GUI) of an application executable at a user device, the transaction flow including a sequence of content pages to be displayed within the GUI of the application over the different stages of the transaction;
identifying dynamic content associated with a tagged UI element of at least one content page of the transaction flow;
simulating a display of the dynamic content within the tagged UI element on the at least one content page, based on a software configuration or a hardware configuration of the user device;
validating the dynamic content for the tagged UI element of the at least one content page based on visual features in the simulated display and corresponding features of the tagged UI element according to the software configuration or the hardware configuration of the user device; and
providing, via a network to the application at the user device, the validated dynamic content to be displayable with the tagged UI element on the at least one content page of the transaction flow during a corresponding stage of the transaction.

11. The method of claim 10, wherein the transaction flow is determined in response to a transaction request received via the network from the application at the user device, and the transaction request includes device metadata identifying the software configuration or the hardware configuration of the user device.

12. The method of claim 10, wherein identifying the dynamic content comprises:
identifying content metadata associated with the tagged UI element of the at least one content page, the content metadata identifying a source of the dynamic content; and
acquiring the dynamic content from the source identified by the content metadata.

13. The method of claim 12, wherein the content metadata further identifies a baseline specification for a content display area of the tagged UI element on the at least one content page, and wherein the validating the dynamic content comprises:
extracting the visual features of the dynamic content relative to the content display area of the tagged UI element from a snapshot of the simulated display; and
validating the dynamic content acquired from the source for the content display area of the tagged UI element when the extracted visual features match the corresponding features of the content display area according to the baseline specification.

14. The method of claim 13, wherein validating the dynamic content further comprises:
calculating a content fit score for the dynamic content acquired from the source, the content fit score representing a degree of similarity between the extracted visual features of the dynamic content and the corresponding features of the content display area according to the baseline specification;
validating the dynamic content when the calculated content fit score meets a predetermined threshold; and transmitting a content validation failure notification to the source of the dynamic content when the calculated content fit score fails to meet the predetermined threshold.

15. The method of claim 13, wherein:
the baseline specification defines boundaries for a length and a width of the content display area on the at least one content page;
the visual features of the dynamic content extracted from the snapshot of the simulated display include dimensions of a visible portion of the dynamic content relative to the boundaries of the content display area; and
the dynamic content is validated for the content display area of the tagged UI element when the visible portion of the dynamic content from the simulated display matches the dynamic content as acquired from the source, and when the dimensions of the visible portion fall within the respective boundaries for the length and the width of the content display area as defined by the baseline specification.

16. The method of claim 15, wherein:
the dimensions of the visible portion of the dynamic content include relative distances of the visible portion of the dynamic content from the respective boundaries for the length and the width of the content display area; and
the dimensions of the visible portion fall within the boundaries of the content display area when the relative distances are within predetermined threshold distances from the respective boundaries.

17. The method of claim 12, wherein the dynamic content acquired from the source includes different variants of the dynamic content, and the method further comprises:
classifying the different variants of the dynamic content for a plurality of device configurations, each of the device configurations including a different set of content display parameters for the tagged UI element; and
storing each variant of the dynamic content with a corresponding device configuration recommended for that variant, based on the classifying.

18. The method of claim 17, wherein validating the dynamic content comprises:
identifying a device configuration in the plurality of device configurations that corresponds to the software configuration or the hardware configuration of the user device;
selecting a stored variant of the dynamic content corresponding to the identified device configuration; and
resolving the selected variant for the tagged UI element on the at least one content page via the GUI of the application at the user device, based on the content display parameters of the corresponding device configuration.

19. The method of claim 17, wherein the set of content display parameters associated with each of the device configurations includes boundaries for a content display area of the tagged UI element on the at least one content page, and the boundaries of the content display area for each device configuration are customized for at least one of a display screen size or a display screen resolution associated with that device configuration.

20. A non-transitory machine-readable medium having stored thereon machine-readable instructions executable to cause a machine to perform operations comprising:
receiving, via a network from an application executable at a user device, a request for a transaction, the request including device metadata identifying a software configuration and a hardware configuration of the user device;

responsive to the received request, determining a transaction flow for the transaction to be conducted via a graphical user interface (GUI) of the application at the user device, the transaction flow including a sequence of content pages to be displayed within the GUI of the application over different stages of the transaction;

identifying dynamic content associated with a tagged UI element of at least one content page of the transaction flow;

simulating a display of the dynamic content within the tagged UI element on the at least one content page, based on the software configuration or the hardware configuration of the user device;

validating the dynamic content for the tagged UI element of the at least one content page based on visual features in the simulated display and corresponding features of the tagged UI element according to the software configuration or the hardware configuration of the user device; and providing, via a network to the application at the user device, the validated dynamic content to be displayable with the tagged UI element on the at least one content page of the transaction flow during a corresponding stage of the transaction.

* * * * *